US008013647B2

United States Patent
Inukai et al.

(10) Patent No.: US 8,013,647 B2
(45) Date of Patent: Sep. 6, 2011

(54) PHYSICAL QUANTITY DETECTION CIRCUIT AND PHYSICAL QUANTITY SENSOR DEVICE

(75) Inventors: Fumihito Inukai, Kyoto (JP); Seiichi Muroya, Osaka (JP); Yoichi Kaino, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/621,837

(22) Filed: Nov. 19, 2009

(65) Prior Publication Data

US 2010/0066423 A1  Mar. 18, 2010

Related U.S. Application Data

(63) Continuation of application No. PCT/JP2009/000304, filed on Jan. 27, 2009.

(30) Foreign Application Priority Data

Apr. 4, 2008 (JP) ................................ 2008-098697

(51) Int. Cl.
*H03L 7/00* (2006.01)
(52) U.S. Cl. ...................................... 327/163; 327/160
(58) Field of Classification Search .................. None
See application file for complete search history.

(56) References Cited

U.S. PATENT DOCUMENTS

| 5,264,914 | A | * | 11/1993 | Oho et al. ..................... 356/460 |
| 5,812,427 | A | | 9/1998 | Nonoyama et al. |
| 6,249,754 | B1 | | 6/2001 | Neul et al. |
| 6,324,909 | B1 | | 12/2001 | Wyse et al. |
| 7,587,014 | B2 | * | 9/2009 | Lin ............................... 375/355 |

FOREIGN PATENT DOCUMENTS

| JP | 07-146151 | 6/1995 |
| JP | 07-198394 | 8/1995 |
| JP | 07-332986 | 12/1995 |
| JP | 08-014916 | 1/1996 |
| JP | 2004-212111 | 7/2004 |
| JP | 2008-014932 | 1/2008 |

OTHER PUBLICATIONS

Japanese Notice of Reasons for Rejections, w/ English translation thereof, issued in Japanese Patent Application No. JP 2008-098697 dated Feb. 8, 2011.

* cited by examiner

*Primary Examiner* — Cassandra Cox
(74) *Attorney, Agent, or Firm* — McDermott Will & Emery LLP

(57) ABSTRACT

A physical quantity detection circuit (12) is used for a physical quantity sensor (10) that outputs a sensor signal according to a physical quantity given externally. A phase adjustment circuit (100) receives a reference clock (CKref) and operates in synchronization with an operation clock (CKa), to delay a transition edge of the reference clock by a predetermined number of pulses of the operation clock. A detection circuit (104) detects a physical quantity signal from the sensor signal (Ssnc) using a transition edge of a clock (SSS) from the phase adjustment circuit (100) as the reference.

9 Claims, 20 Drawing Sheets

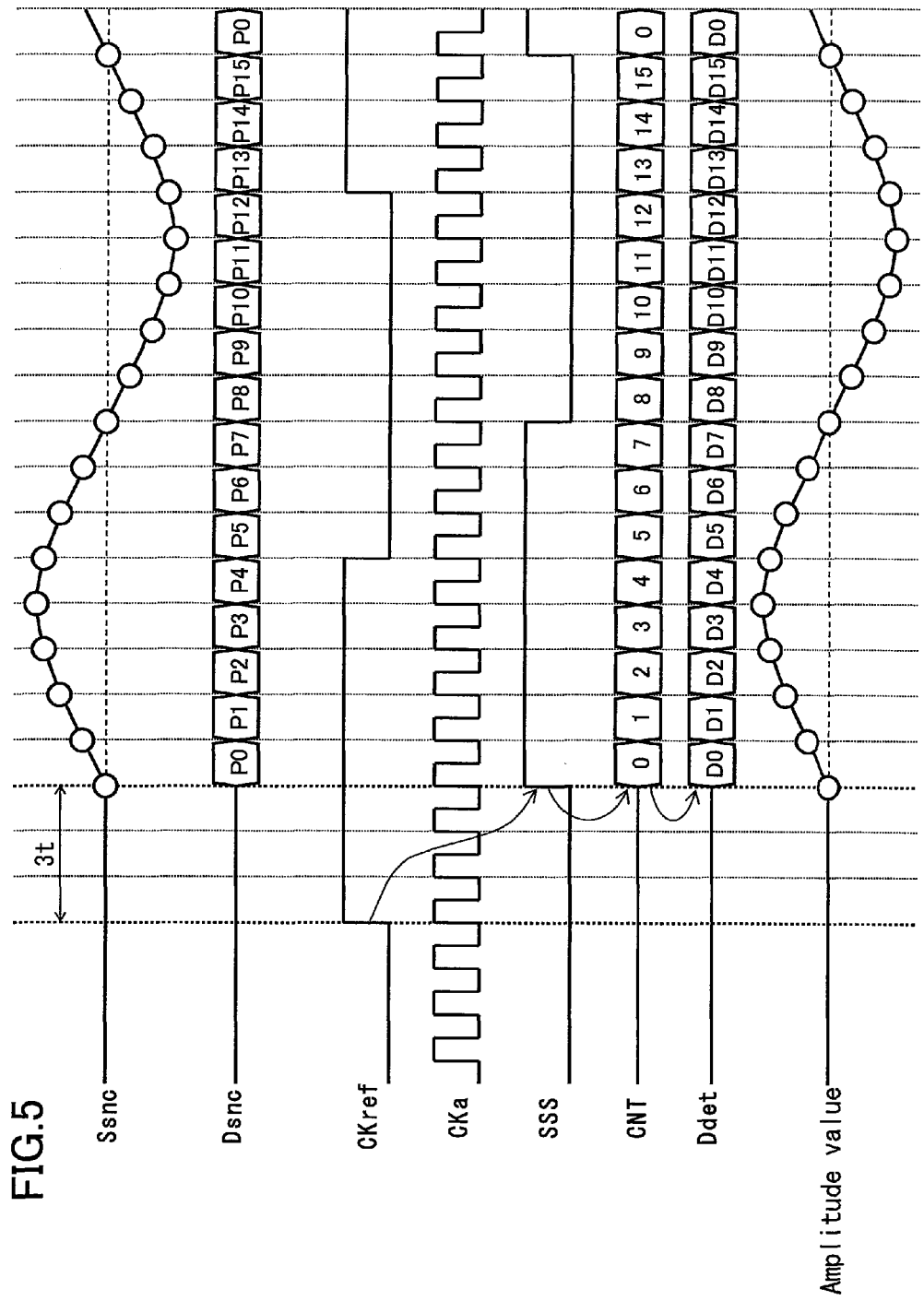

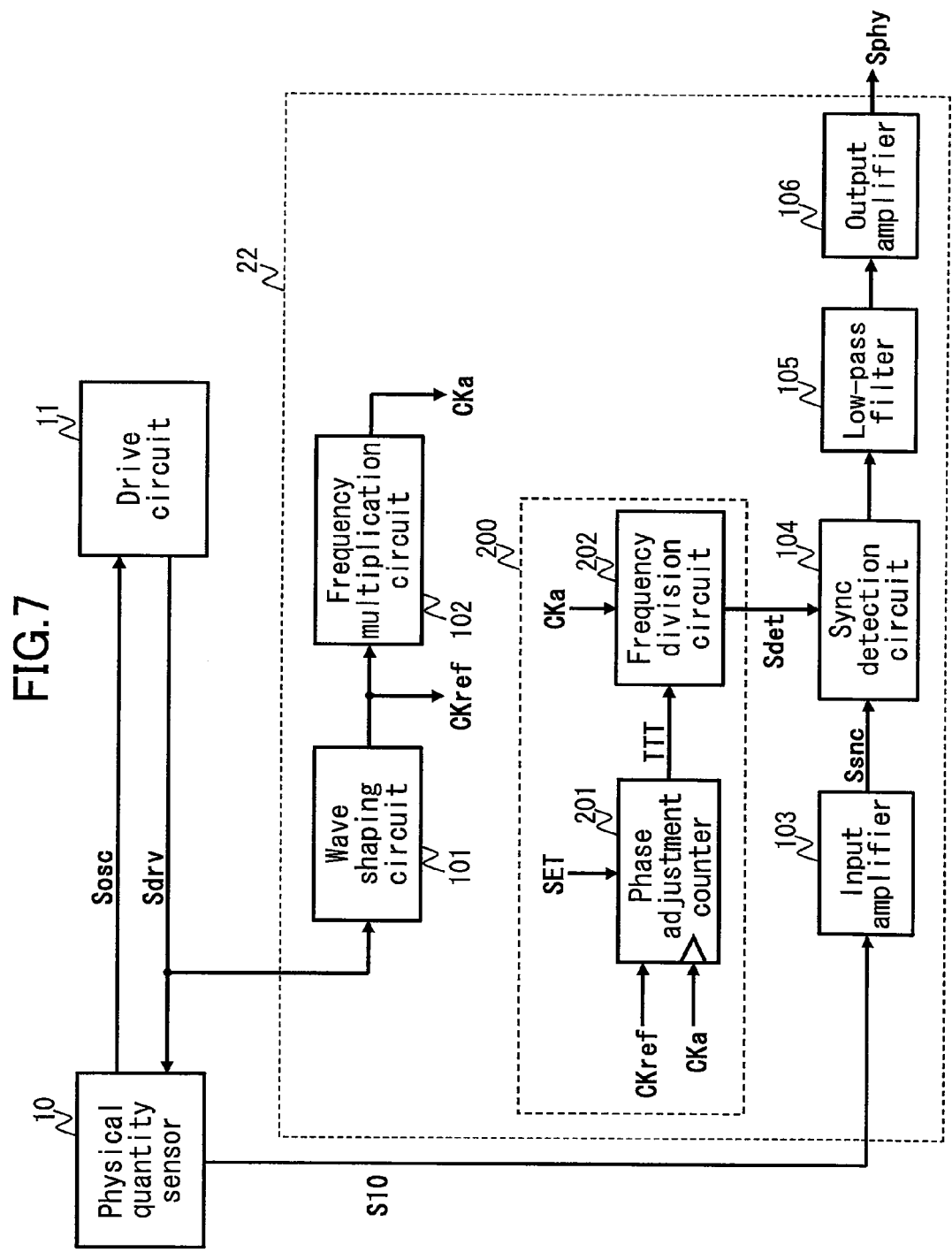

PHYSICAL QUANTITY DETECTION CIRCUIT AND PHYSICAL QUANTITY SENSOR DEVICE

CROSS-REFERENCE TO RELATED APPLICATIONS

This is a continuation of PCT International Application PCT/JP2009/000304 filed on Jan. 27, 2009, which claims priority to Japanese Patent Application No. 2008-098697 filed on Apr. 4, 2008. The disclosures of these applications including the specifications, the drawings, and the claims are hereby incorporated by reference in its entirety.

BACKGROUND

The technique disclosed herein relates to a physical quantity detection circuit used for a physical quantity sensor that detects a physical quantity given externally and to a physical quantity sensor device provided with the same, and more particularly, to a technique of adjusting the phase relationship between a sensor signal and a detection signal.

Conventionally, physical quantity sensor devices capable of detecting a physical quantity (e.g., an angular velocity, an acceleration, etc.) are used in a variety of technical fields such as detection of shake of a digital camera, attitude control of a mobile unit (e.g., an aircraft, an automobile, a robot, a vessel, etc.), and guidance of a missile and a spacecraft. In general, a physical quantity sensor device includes: a physical quantity sensor that outputs a sensor signal according to a physical quantity given externally; and a physical quantity detection circuit that detects a physical quantity signal (signal corresponding to the physical quantity) from the sensor signal using a detection signal (signal having a frequency corresponding to the frequency of the sensor signal). In such a physical quantity detection circuit, an unintentional phase shift may sometimes occur between the sensor signal and the detection signal due to fabrication variations (diffusion variations in resistances and capacitors, etc.) and fluctuations in the surrounding environment (e.g., changes in temperature, etc.). It is therefore important to adjust the phase relationship between the sensor signal and the detection signal to keep the sensor signal and the detection signal synchronized with each other. To address this problem, Japanese Laid-Open Patent Publication No. 8-14916 discloses a vibration gyro, provided with a phase correction circuit including a temperature-sensitive element (element having a predetermined temperature characteristic), to correct a phase shift caused by a temperature change.

SUMMARY

However, due to fabrication variations, the phase correction circuit does not always exhibit a desired temperature characteristic, and hence it has been difficult to set the phase correction amount precisely in the phase adjustment circuit. As such, conventionally, with the failure of precise adjustment of the phase relationship between the sensor signal and the detection signal, it has been difficult to improve the detection precision.

An object of the technique disclosed herein is adjusting the phase relationship between the sensor signal and the detection signal precisely.

According to one aspect of the present invention, the physical quantity detection circuit is a physical quantity detection circuit used for a physical quantity sensor that outputs a sensor signal according to a physical quantity given externally, the circuit including a first phase adjustment circuit configured to receive a reference clock having a frequency corresponding to the frequency of the sensor signal and operate in synchronization with a first operation clock having a frequency higher than the frequency of the reference clock, to delay a transition edge of the reference clock by a predetermined number of pulses of the first operation clock, and a detection circuit configured to detect a physical quantity signal corresponding to the physical quantity from the sensor signal using a transition edge of the reference clock delayed by the first phase adjustment circuit as the reference. In this physical quantity detection circuit, the phase of the reference clock (i.e., the phase of the detection signal) can be set using the period of the first operation clock as the unit. Also, as the frequency of the first operation clock is higher, the phase of the reference clock can be set more precisely. Hence, the phase relationship between the sensor signal and the detection signal can be adjusted more precisely than conventionally done, permitting improvement in detection precision.

The first phase adjustment circuit described above may include: a shift register configured to shift the reference clock sequentially in synchronization with the first operation clock to generate a plurality of delayed clocks; and a selector configured to select one of the plurality of delayed clocks generated by the shift register. The detection circuit may detect the physical quantity signal from the sensor signal using a transition edge of the delayed clock selected by the selector as the reference. With this configuration, the reference clock can be delayed by a predetermined number of pulses of the first operation clock.

The detection circuit described above may include: an analog-to-digital converter circuit configured to convert the sensor signal to a digital sensor signal; a detection signal generator circuit configured to generate a digital detection signal corresponding to a sine wave signal in response to a transition edge of the delayed clock selected by the selector; and a multiplier circuit configured to multiply the digital sensor signal obtained by the analog-to-digital converter circuit by the digital detection signal generated by the detection signal generator circuit, to detect the physical quantity signal. By digitizing the physical quantity detection circuit in this way, the robustness against fabrication variations and fluctuations in the surrounding environment (e.g., fluctuations in power supply voltage and changes in temperature) can be enhanced.

Alternatively, the first phase adjustment circuit may include a phase adjustment counter configured to start counting the number of generated pulses of the first operation clock in response to a transition edge of the reference clock and generate a timing signal once the number of generated pulses reaches a predetermined value. The detection circuit may detect the physical quantity signal from the sensor signal using a transition edge of the timing signal generated by the phase adjustment counter as the reference. With this configuration, the reference clock can be delayed by a predetermined number of pulses of the first operation clock.

The detection circuit described above may include: an analog-to-digital converter circuit configured to convert the sensor signal to a digital sensor signal; a detection signal generator circuit configured to generate a digital detection signal corresponding to a sine wave signal in response to a transition edge of the timing signal generated by the phase adjustment counter; and a multiplier circuit configured to multiply the digital sensor signal obtained by the analog-to-digital converter circuit by the digital detection signal generated by the detection signal generator circuit, to detect the physical quantity signal. By digitizing the physical quantity detection circuit in this way, the robustness against fabrication variations and fluctuations in the surrounding environment can be enhanced.

Preferably, the physical quantity detection circuit described above further includes: a second phase adjustment circuit configured to receive the digital sensor signal obtained by the analog-to-digital converter circuit and operate in synchronization with a second operation clock having a frequency higher than the frequency of the reference clock, to delay the digital sensor signal by a predetermined number of pulses of the second operation clock, wherein the multiplier circuit multiplies the digital sensor signal delayed by the second phase adjustment circuit by the digital detection signal. In this physical quantity detection circuit, with the phases of both the sensor signal and the detection signal being settable, it is possible to correct both a phase delay in the sensor signal and a phase delay in the detection signal.

Preferably, the frequency of the first operation clock is lower than the frequency of the second operation clock. With this setting, the precision of the phase adjustment of the first phase adjustment circuit is lower than that of the second phase adjustment circuit. With this sharing of the phase adjustment processing between the first and second phase adjustment circuits that are different in phase adjustment precision, the circuit scale and power consumption required for the phase adjustment processing can be reduced.

According to another aspect of the invention, the physical quantity detection circuit is a physical quantity detection circuit used for a physical quantity sensor that outputs a sensor signal according to a physical quantity given externally, the circuit including: an analog-to-digital converter circuit configured to convert the sensor signal to a digital sensor signal; a detection signal generator circuit configured to generate a digital detection signal corresponding to a sine wave signal in response to a transition edge of a reference clock having a frequency corresponding to the frequency of the sensor signal; a phase adjustment circuit configured to receive the digital sensor signal obtained by the analog-to-digital converter circuit and operate in synchronization with a clock having a frequency higher than the frequency of the reference clock, to delay the digital sensor signal by a predetermined number of pulses of the operation clock; and a multiplier circuit configured to multiply the digital sensor signal delayed by the phase adjustment circuit by the digital detection signal generated by the detection signal generator circuit, to detect a physical quantity signal corresponding to the physical quantity. In this physical quantity detection circuit, the phase of the sensor signal (digital sensor signal) can be set using the period of a clock having a frequency higher than the frequency of the reference clock as the unit. Also as the frequency of the clock is higher, the phase of the digital sensor signal can be set more precisely. Hence, the phase relationship between the sensor signal and the detection signal can be adjusted more precisely than conventionally done, permitting improvement in detection precision.

According to yet another aspect of the invention, the physical quantity detection method is a method for detecting a physical quantity signal from a sensor signal from a physical quantity sensor that detects a physical quantity given externally, the physical quantity signal corresponding to the physical quantity, the physical quantity detection method including the steps of: delaying at least one of the sensor signal and a detection signal corresponding to the sensor signal by a predetermined number of pulses of an operation clock having a frequency higher than the frequency of the sensor signal; and detecting the physical quantity signal using the sensor signal and the detection signal at is least one of which has been delayed. In this physical quantity detection method, the phase relationship between the sensor signal and the detection signal can be adjusted using the period of a signal having a frequency higher than the frequency of the reference clock as the unit.

BRIEF DESCRIPTION OF THE DRAWINGS

FIG. 5 is a timing chart illustrating the operation of the physical quantity detection circuit shown in FIG. 3.

FIG. 7 is a view showing an example configuration of a physical quantity sensor device of Embodiment 2.

DETAILED DESCRIPTION

Figure 1:
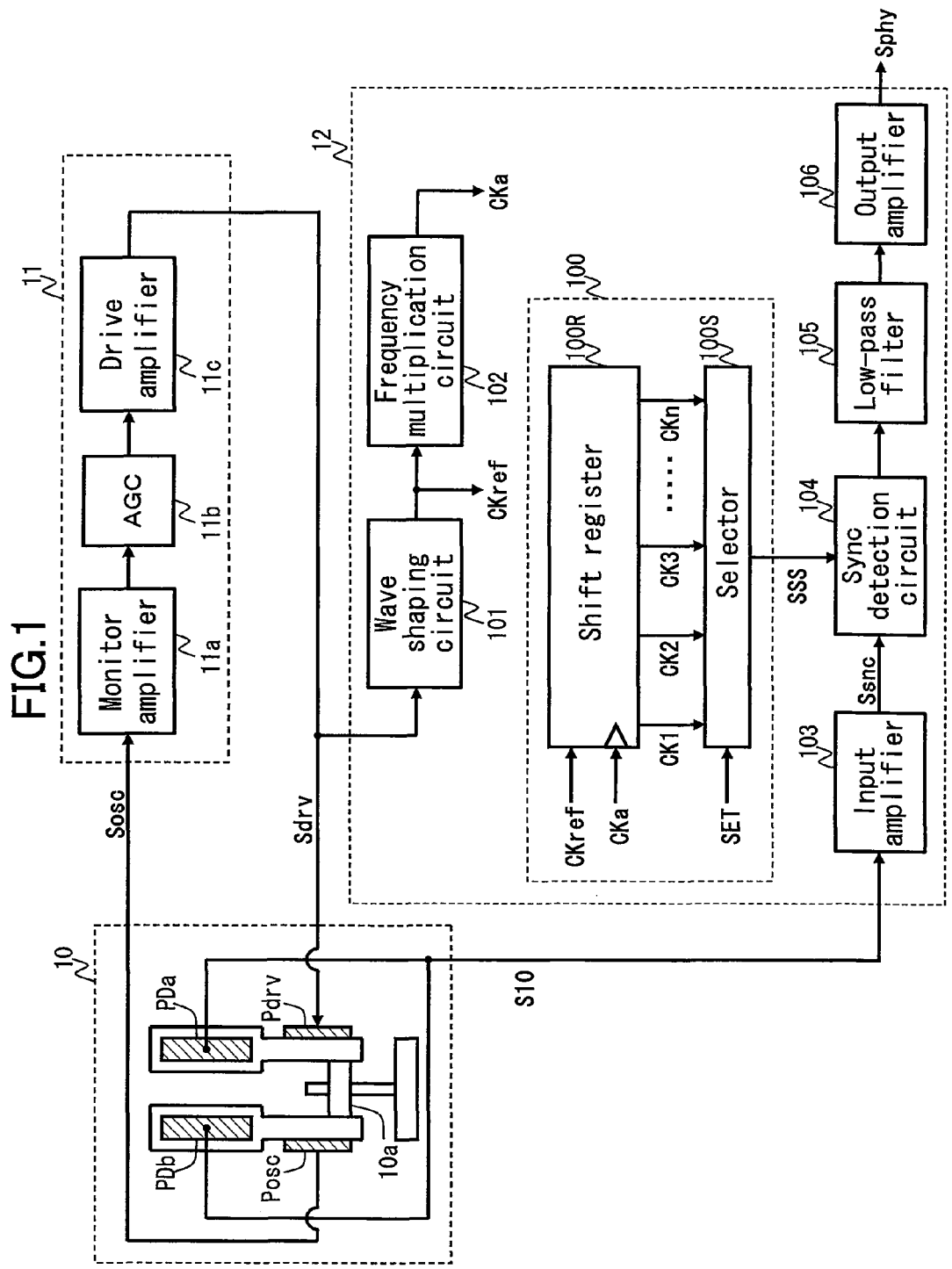
FIG. 1 is a view showing an example configuration of a physical quantity sensor device of Embodiment 1.

Preferred embodiments will be described in detail hereinafter with reference to the accompanying drawings. It should be noted that identical or equivalent components are denoted by the same reference characters throughout the drawings, and no repeated description will be made on such components.

Embodiment 1

FIG. 1 shows an example configuration of a physical quantity sensor device of Embodiment 1. The physical quantity sensor device includes a physical quantity sensor 10, a drive circuit 11, and a physical quantity detection circuit 12.

[Physical Quantity Sensor]

The physical quantity sensor 10 receives a drive signal Sdrv having a predetermined frequency from the drive circuit 11, and outputs a sensor signal S10 according to a physical quantity (e.g., an angular velocity, an acceleration, etc.) given externally. The frequency of the sensor signal S10 corresponds to the frequency of the drive signal Sdrv. For example, the center frequency (carrier frequency) of the sensor signal S10 is equal to the frequency of the drive signal Sdrv. Assume in this embodiment that the physical quantity sensor 10 is a tuning fork type angular velocity sensor. The physical quantity sensor 10 includes a tuning fork body 10*a*, a drive piezoelectric element Pdrv, an oscillation detection piezoelectric element Posc, and angular velocity detection piezoelectric elements PDa and PDb. The tuning fork body 10*a* has two prongs each twisted by the right angle in the center, a connection for connecting the two prongs at their ends on one side, and a support pin provided at the connection to serve as a rotation axis. The drive piezoelectric element Pdrv oscillates one prong according to the frequency and amplitude of the drive signal Sdrv supplied from the drive circuit 11, causing resonance of the two prongs. With this oscillation of the tuning fork, charge is generated in the is oscillation detection piezoelectric element Posc (i.e., an oscillation signal Sosc is generated). Also, once a rotational angular velocity occurs, an amount of charge responsive to the rotational angular velocity (Coriolis force) is generated in the angular velocity detection piezoelectric elements PDa and PDb (i.e., the sensor signal S10 is generated).

[Drive Circuit]

The drive circuit 11 supplies the drive signal Sdrv to the physical quantity sensor 10. Also, the drive circuit 11 adjusts the frequency and amplitude of the drive signal Sdrv according to the oscillation signal Sosc from the physical quantity sensor 10. In the drive circuit 11, a monitor amplifier 11*a* converts the oscillation signal Sosc from the physical quantity sensor 10 to a voltage. An automatic gain control amplifier (AGC) 11*b* amplifies or attenuates the output of the monitor amplifier 11*a*, changing its amplification gain so that the voltage supplied to a drive amplifier 11*c* is kept constant. The drive amplifier 11*c* controls the frequency and amplitude of the drive signal Sdrv according to the output of the AGC 11*b*. In this way, with the adjustment of the drive signal Sdrv according to the oscillation signal Sosc, the maximum oscillation amplitude and oscillation frequency of the physical quantity sensor 10 are kept constant.

[Physical Quantity Detection Circuit]

The physical quantity detection circuit 12 detects the physical quantity based on the sensor signal S10 from the physical quantity sensor 10. The physical quantity detection circuit 12 includes a wave shaping circuit 101, a frequency multiplication circuit 102, a phase adjustment circuit 100, an input amplifier 103, a sync detection circuit 104, a low-pass filter 105, and an output amplifier 106.

The wave shaping circuit 101 converts the drive signal Sdrv to a square wave and outputs the resultant signal as a reference clock CKref. The wave shaping circuit 101 is includes a comparator or an inverter, for example. The frequency of the reference clock CKref is substantially the same as the frequency of the drive signal Sdrv (i.e., the frequency of the sensor signal S10). The frequency multiplication circuit 102 multiplies the reference clock CKref to generate an operation clock CKa having a frequency higher than that of the reference clock CKref. The frequency multiplication circuit 102 includes a phase locked loop (PLL), for example.

The phase adjustment circuit 100 includes a shift register 100R and a selector 100S. The shift register 100R shifts the reference clock CKref from the wave shaping circuit 101 sequentially in synchronization with the operation clock CKa from the frequency multiplication circuit 102, to generate n (n is an integer equal to or more than 2) delayed clocks CK1, CK2, . . . , CKn whose phases are shifted from each other by a predetermined amount. The shift register 100R includes a plurality of cascaded flipflops, for example. The selector 100S selects one of the delayed clocks CK1, CK2, . . . , CKn according to a set value SET set under external control, and outputs the selected delayed clock as a selected clock SSS. The set value SET is a value for setting the delay time in the phase adjustment circuit 100, which indicates the number of pulses of the operation clock CKa. For example, when the set value SET is set at "3," the selector 100S selects the third delayed clock CK3. With this selection, the delay time in the phase adjustment circuit 100 is set at the time corresponding to three pulses of the operation clock CKa.

The input amplifier 103 converts the sensor signal S10 received from the physical quantity sensor 10 to a voltage and outputs the resultant signal as an analog sensor signal Ssnc. The sync detection circuit 104 detects a physical quantity signal (signal corresponding to the physical quantity sensed by the physical quantity sensor 10) from the analog sensor signal Ssnc obtained by the input amplifier 103 using the selected clock SSS from the phase adjustment circuit 100. The low-pass filter 105 allows only a low-frequency component of the physical quantity signal detected by the sync detection circuit 104 to pass therethrough for noise removal and the like. The output amplifier 106 amplifies the physical quantity signal processed by the low-pass filter 105 and outputs the resultant signal as an analog detected signal Sphy.

[Operation]

Figure 2:
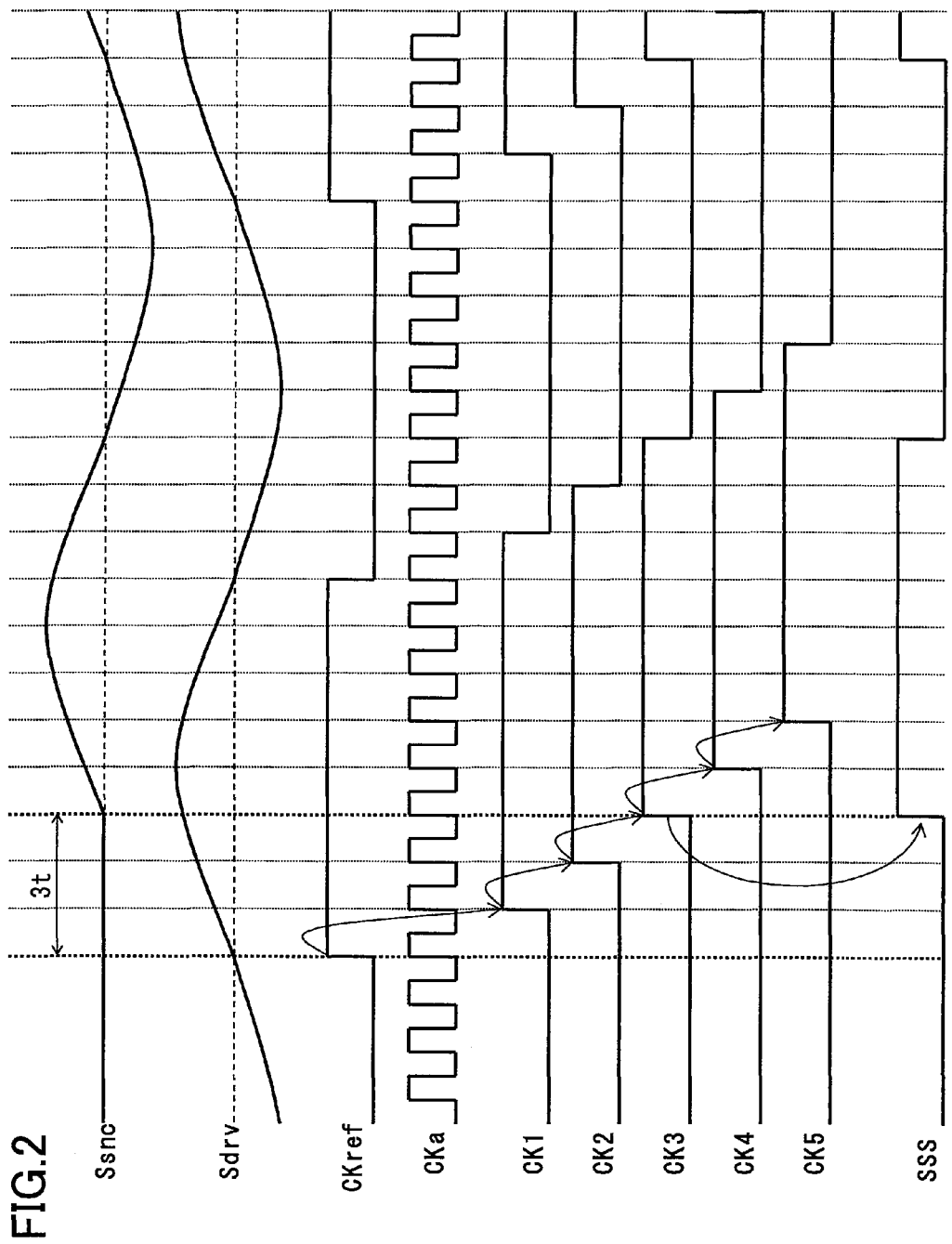
FIG. 2 is a timing chart illustrating the operation of a physical quantity detection circuit shown in FIG. 1.

Next, the operation of the physical quantity detection circuit 12 shown in FIG. 1 will be described with reference to FIG. 2. In the illustrated example, assume that the period of the operation clock CKa is "t" and that the phase of the analog sensor signal Ssnc lags behind the phase of the drive signal Sdrv (i.e., the phase of the reference clock CKref) by "3t."

The wave shaping circuit 101 converts the drive signal Sdrv to the reference clock CKref, and the frequency multiplication circuit 102 generates the operation clock CKa based on the reference clock CKref. The shift register 100R generates a plurality of delayed clocks CK1, CK2, . . . , CKn (five in FIG. 2). At this time, when the set value SET is set at "3," the selector 100S selects the third delayed clock CK3 as the selected clock SSS. This enables the selected clock SSS to have the same phase as that of the analog sensor signal Ssnc. Also, since the frequency of the selected clock SSS is the same as that of the reference clock CKref, the sync detection circuit 104 is allowed to multiply the analog sensor signal Ssnc by the selected clock SSS from the phase adjustment circuit 100 as it is, to detect the physical quantity signal (analog value). In this way, the sync detection circuit 104 starts detection of the physical quantity signal using a transition edge (a rising edge in the illustrated example) of the selected clock SSS as the reference. Also, the transition edges of the selected clock SSS lag behind those of the reference clock CKref by "3t." In other words, the phase adjustment circuit 100 delays the transition edges of the reference clock CKref by the time corresponding to three pulses of the operation clock CKa.

As described above, the phase of the detection signal (selected clock SSS) can be set using the period of the operation clock CKa as the unit, and as the frequency of the operation clock CKa is higher, the phase of the selected clock SSS can be set more precisely. Hence, the phase relationship between the sensor signal and the detection signal can be adjusted more precisely than conventionally done, permitting improvement in detection precision.

The phase adjustment circuit 100 may otherwise be constructed of digital circuits. With this configuration, the robustness against fabrication variations and fluctuations in the surrounding environment (e.g., fluctuations in power supply voltage and changes in temperature) can be more enhanced than conventionally done. That is, the error in delay time (delay time in the phase adjustment circuit 100) caused by fabrication variations and fluctuations in the surrounding environment can be reduced.

(Alteration 1 of Embodiment 1)

Figure 3:
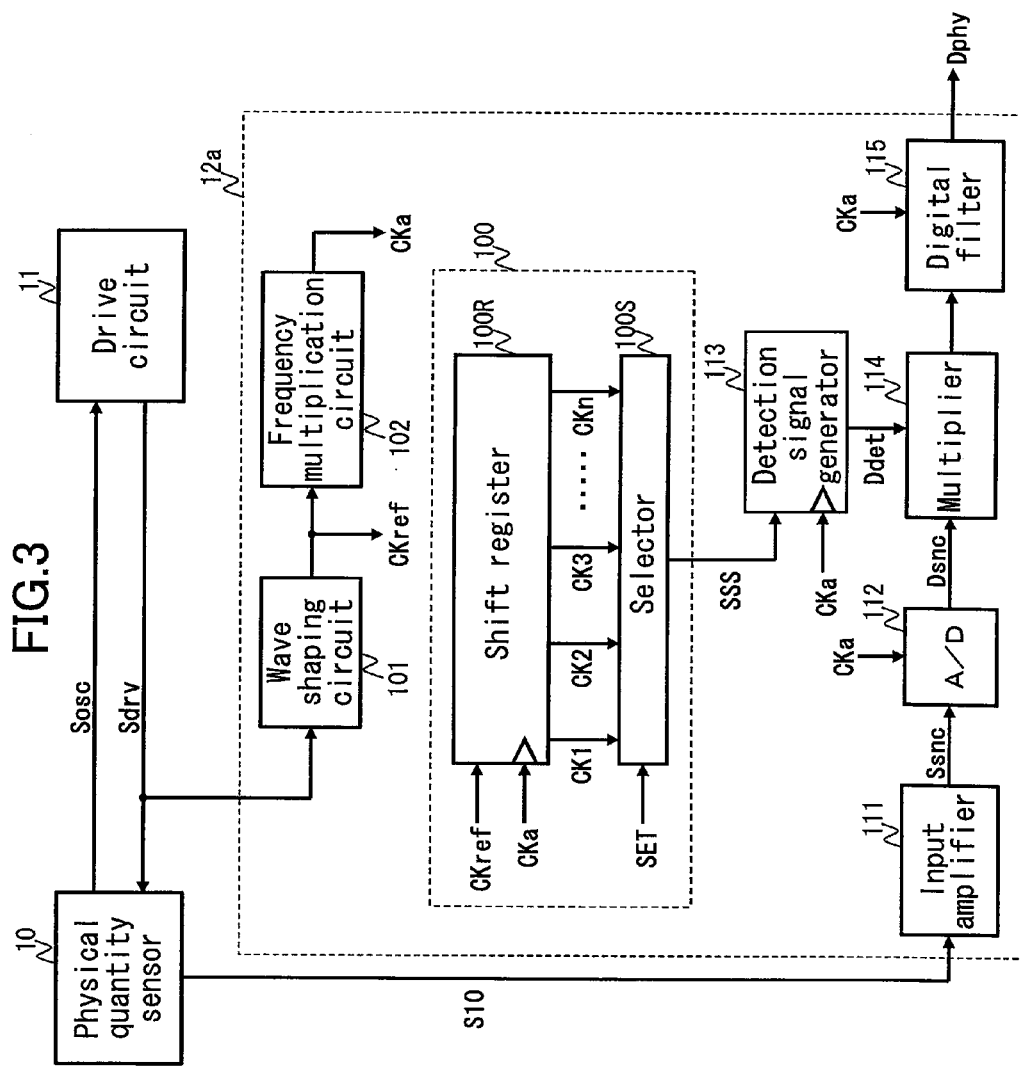
FIG. 3 is a view showing an alteration of the physical quantity detection circuit shown in FIG. 1.

The phase adjustment circuit 100 can also be applied to a digitized physical quantity detection circuit as shown in FIG. 3. A physical quantity detection circuit 12a shown in FIG. 3 includes an input amplifier 111, an analog-to-digital converter (A/D) 112, a detection signal generator 113, multiplier 114, and a digital filter 115, in addition to the wave shaping circuit 101, the frequency multiplication circuit 102, and the phase adjustment circuit 100 shown in FIG. 1.

The input amplifier 111 converts the sensor signal S10 received from the physical quantity sensor 10 to a voltage and outputs the resultant signal as an analog sensor signal Ssnc. The analog-to-digital converter 112 samples the analog sensor signal Ssnc in synchronization with the operation clock CKa and converts sampled analog values (amplitude values) to digital values. In this way, the analog sensor signal Ssnc is converted to a digital sensor signal Dsnc that contains a plurality of digital values.

The detection signal generator 113 generates a digital detection signal Ddet corresponding to a sine wave signal in response to a transition edge (a rising edge in the illustrated example) of the selected clock SSS from the phase adjustment circuit 100. The digital detection signal Ddet contains a plurality of sine wave data units, which respectively correspond to a plurality of analog values (amplitude values) obtained by sampling a sine wave signal having a predetermined frequency (e.g., the drive signal Sdrv) in synchronization with a predetermined clock (e.g., the operation clock CKa) (see FIG. 4B). For example, the plurality of sine wave data units indicate ideal amplitude values expressed by a sine function.

The multiplier 114 multiplies the digital sensor signal Dsnc from the analog-to-digital converter 112 by the digital detection signal Ddet from the detection signal generator 113. With this multiplication, a physical quantity signal (digital values) is detected. The digital filter 115, operating in synchronization with the operation clock CKa, allows only a low-frequency component of the physical quantity signal detected by the multiplier 114 to pass therethrough as a digital detected signal Dphy for noise removal and the like.

[Detection Signal Generator]

Figure 4A:
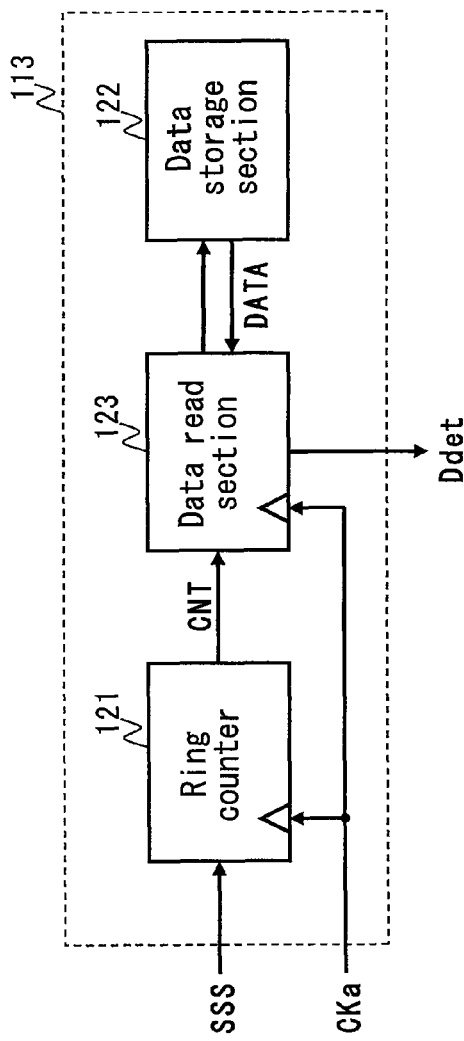
FIG. 4A is a view showing an example configuration of a detection signal generator shown in FIG. 3.
Figure 4B:
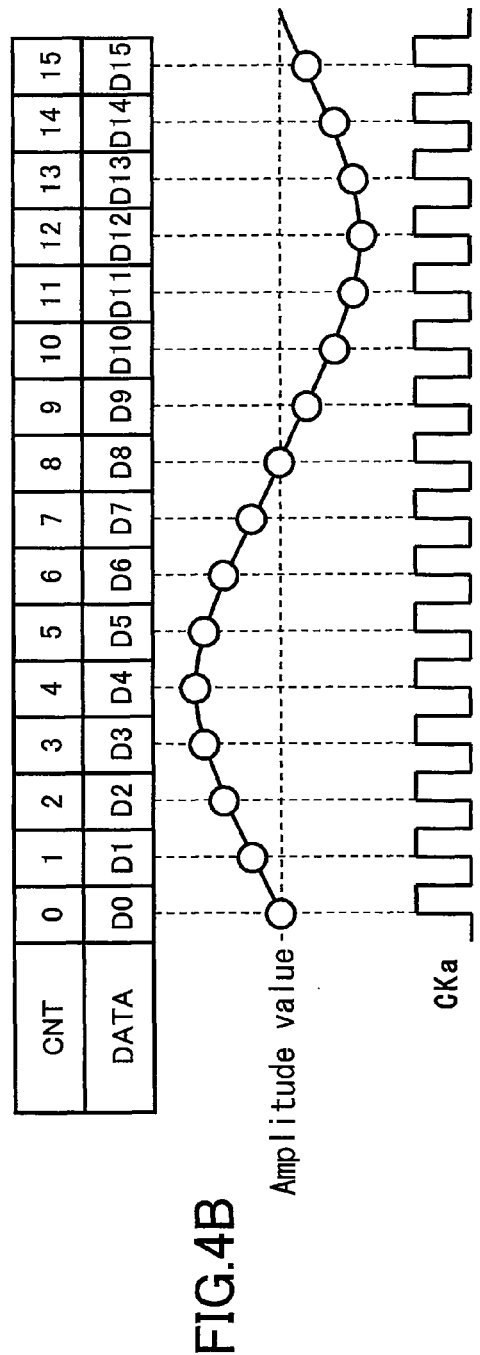
FIG. 4B is a view showing an example correspondence between the count value and the sine wave data in the detection signal generator of FIG. 4A.

As shown in FIG. 4A, the detection signal generator 113 includes a ring counter 121, a data storage section 122, and a data read section 122. The ring counter 121 and the data read section 123 operate in synchronization with the operation clock CKa. The ring counter 121 starts incrementing the count value CNT in response to a transition edge of the selected clock SSS, and resets the count value CNT to "0" once the count value CNT reaches a predetermined maximum value. The data storage section 122 stores a plurality of units of sine wave data DATA on which the digital detection signal Ddet is based. The data read section 123 reads the sine wave data DATA corresponding to the count value CNT of the ring counter 121 based on the preset correspondence between the count value CNT and the sine wave data DATA (FIG. 4B), and outputs the read sine wave data. In this way, by outputting the sine wave data units D0, D1, D2, ..., D15 in rotation, the digital detection signal Ddet corresponding to the sine wave signal is generated.

[Operation]

Next, the operation of the physical quantity detection circuit 12a shown in FIG. 3 will be described with reference to FIG. 5. Assume in this alteration that the phase of the analog sensor signal Ssnc lags behind the phase of the reference clock CKref by "3t."

The analog-to-digital converter 112 converts the analog sensor signal Ssnc to digital values P0, P1, P2, ... in synchronization with the operation clock CKa. At this time, when the set value SET is set at "3," the phase adjustment circuit 100 delays the reference clock CKref by the time "3t" corresponding to three pulses of the operation clock CKa, and outputs the delayed clock as the selected clock SSS. The detection signal generator 113 outputs the sine wave data units D0, D1, D2, ... in rotation in response to a transition edge of the selected clock SSS. This enables the digital detection signal Ddet to have the same phase as that of the analog sensor signal Ssnc. The multiplier 114 multiplies the digital values P0, P1, P2, ... from the analog-to-digital converter 112 by the sine wave data units D0, D1, D2, ... from the detection signal generator 113, respectively. In this way, the phase of the digital detection signal Ddet is determined with a transition edge of the selected clock SSS. In other words, the multiplier 114 starts detection of the physical quantity signal using a transition edge of the selected clock SSS as the reference.

As described above, the phase adjustment circuit 100 is also applicable to the digitized physical quantity detection circuit. Also, by digitizing the physical quantity detection circuit, the robustness against fabrication variations and fluctuations in the surrounding environment can be enhanced, and hence the detection precision can be further improved.

Note that another operation clock (a clock different in frequency from the operation clock CKa) having a frequency higher than the frequency of the reference clock CKref may be supplied to the phase adjustment circuit 100.

[Alteration of Detection Signal Generator]

Figures 6A, 6B:
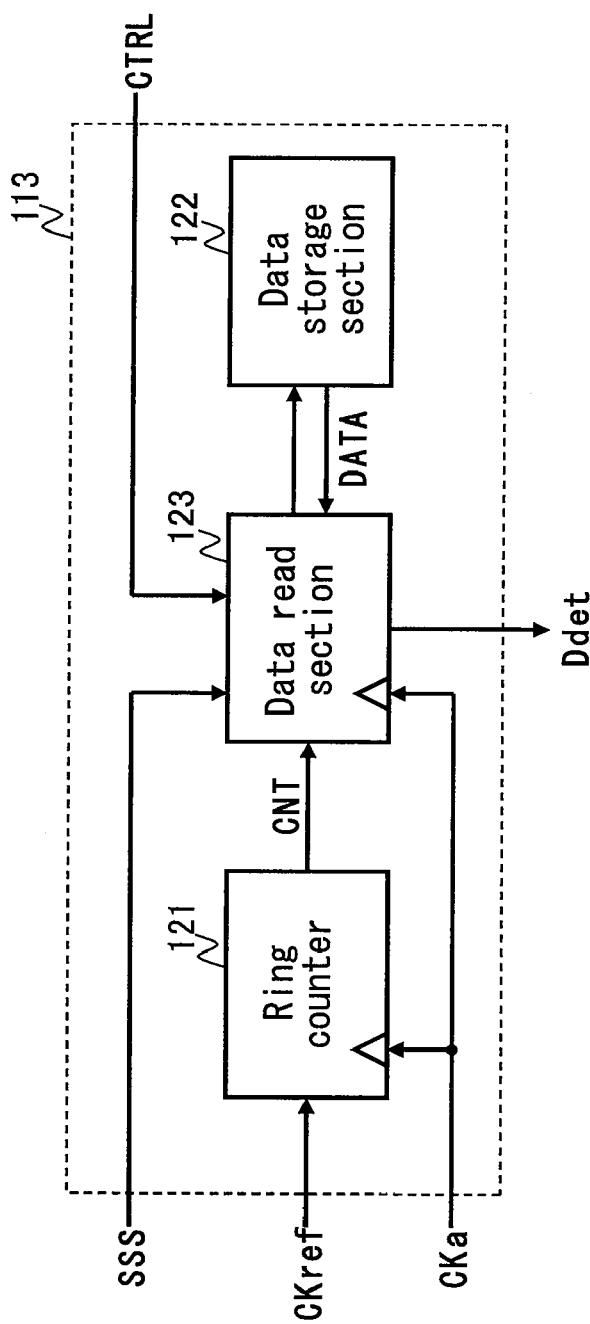
FIG. 6A is a view showing another example configuration of the detection signal generator shown in FIG. 3.
FIG. 6B is a view showing an example correspondence between the count value and the sine wave data in the detection signal generator of FIG. 6A.

As shown in FIG. 6A, the detection signal generator 113 may be configured so that the ring counter 121 starts incrementing the count value CNT in response to a transition edge of the reference clock CKref. In this case, the correspondence between the count value CNT and the sine wave data DATA in the data read section 123 can be set under external control CTRL. The data read section 123 starts reading the sine wave data DATA corresponding to the count value CNT in response to a transition edge of the selected clock SSS. For example, when the set value SET in the phase adjustment circuit 100 is set at "3," the correspondence between the count value CNT and the sine wave data DATA is set as shown in FIG. 6B. With such setting, the detection signal generator 113 is allowed to output the sine wave data units D0, D1, D2, ... in rotation in response to a transition edge of the selected clock SSS.

Embodiment 2

FIG. 7 shows an example configuration of a physical quantity sensor device of Embodiment 2. This physical quantity sensor device includes a physical quantity detection circuit 22 in place of the physical quantity detection circuit 12 shown in FIG. 1. The physical quantity detection circuit 22 includes a phase adjustment circuit 200 in place of the phase adjustment circuit 100 shown in FIG. 1. The other configuration is similar to that in FIG. 1.

The phase adjustment circuit 200 includes a phase adjustment counter 201 and a frequency division circuit 202. The phase adjustment counter 201 starts counting the number of generated pulses of the operation clock CKa in response to a transition edge (a rising edge in the illustrated example) of the reference clock CKref, and outputs a timing signal TTT once the count value reaches a set value SET set under external control. The phase adjustment counter 201 includes a plurality of flipflops and logical operators, for example. The frequency division circuit 202 starts frequency division processing in response to a transition edge of the timing signal TTT from the phase adjustment counter 201 (for example, the output of the frequency division circuit 202 is reset to its initial state). The frequency division circuit 202 then divides the frequency of the operation clock CKa to generate an analog detection signal Sdet having the same frequency as the reference clock CKref. For example, when the frequency of the operation clock CKa is 16 times as high as the frequency of the reference clock CKref, the frequency division circuit 202 divides the frequency of the operation clock CKa by 16.

[Operation]

Figure 8:
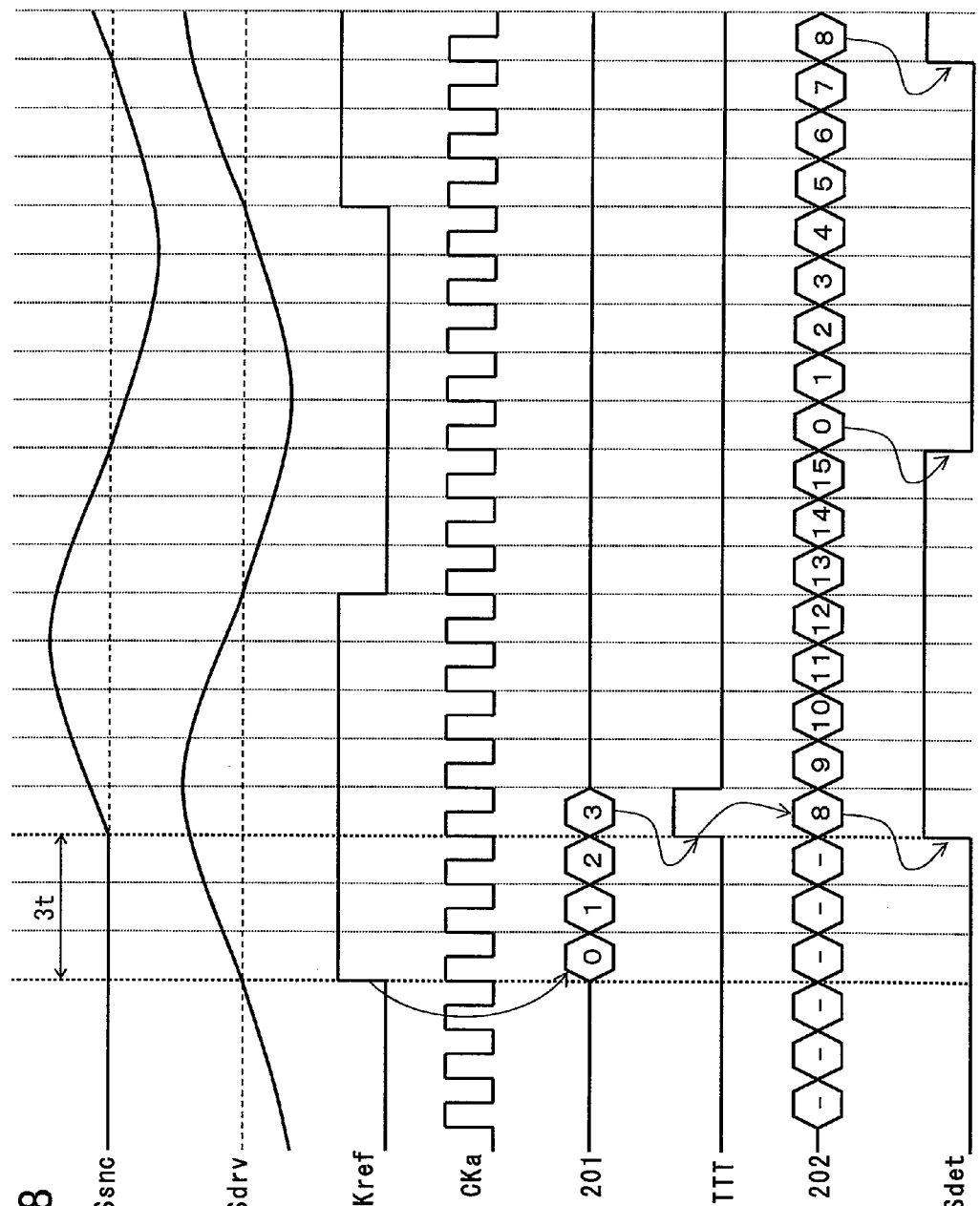
FIG. 8 is a timing chart illustrating the operation of a physical quantity detection circuit shown in FIG. 7.

Next, the operation of the physical quantity detection circuit 22 shown in FIG. 7 will be described with reference to FIG. 8. Assume in this embodiment that the phase of the analog sensor signal Ssnc lags behind the phase of the reference clock CKref by "3t." Assume also that for dividing the frequency of the operation clock CKa by 16, the frequency division circuit 202 includes a 5-bit counter, to supply the output, among five outputs of the 5-bit counter, which corresponds to the most significant bit (MSB) as the analog detection signal Sdet.

The phase adjustment counter 201 starts counting the number of generated pulses of the operation clock CKa in response to a transition edge of the reference clock CKref. At this time, when the set value SET is set at "3," the phase adjustment counter 201 outputs the timing signal TTT once the count value reaches "3." The frequency division is circuit 202 starts counting from the preset initial value (8 in the illustrated example) in response to a transition edge of the timing signal TTT from the phase adjustment counter 201. Once the count value reaches the maximum value (15 in the illustrated example), the frequency division circuit 202 resets the count value to "0." The MSB output of the frequency division circuit 202 is "1" when the count value of the frequency division circuit 202 is any of 8 to 15 and "0" when it is any of 0 to 7. This enables the analog detection signal Sdet to have the same phase as that of the analog sensor signal Ssnc. In this way, the phase of the analog detection signal Sdet is determined with a transition edge of the timing signal TTT. In other words, the sync detection circuit 104 starts detection of the physical quantity signal using a transition edge of the timing signal TTT as the reference.

As described above, the phase of the analog detection signal Sdet can be set using the period of the operation clock CKa as the unit, and as the frequency of the operation clock CKa is higher, the phase of the analog detection signal Sdet can be set more precisely. Hence, the phase relationship between the sensor signal S10 and the detection signal can be adjusted more precisely than conventionally done, permitting improvement in detection precision.

The phase adjustment circuit 200 may otherwise be constructed of digital circuits. With this configuration, the robustness against fabrication variations and fluctuations in the surrounding environment can be more enhanced than conventionally done.

The frequency division circuit 202 may divide another operation clock (a clock different in frequency from the operation clock CKa) having a frequency higher than the frequency of the reference clock CKref, to generate the analog detection signal Sdet.

(Alteration 1 of Embodiment 2)

Figure 9:
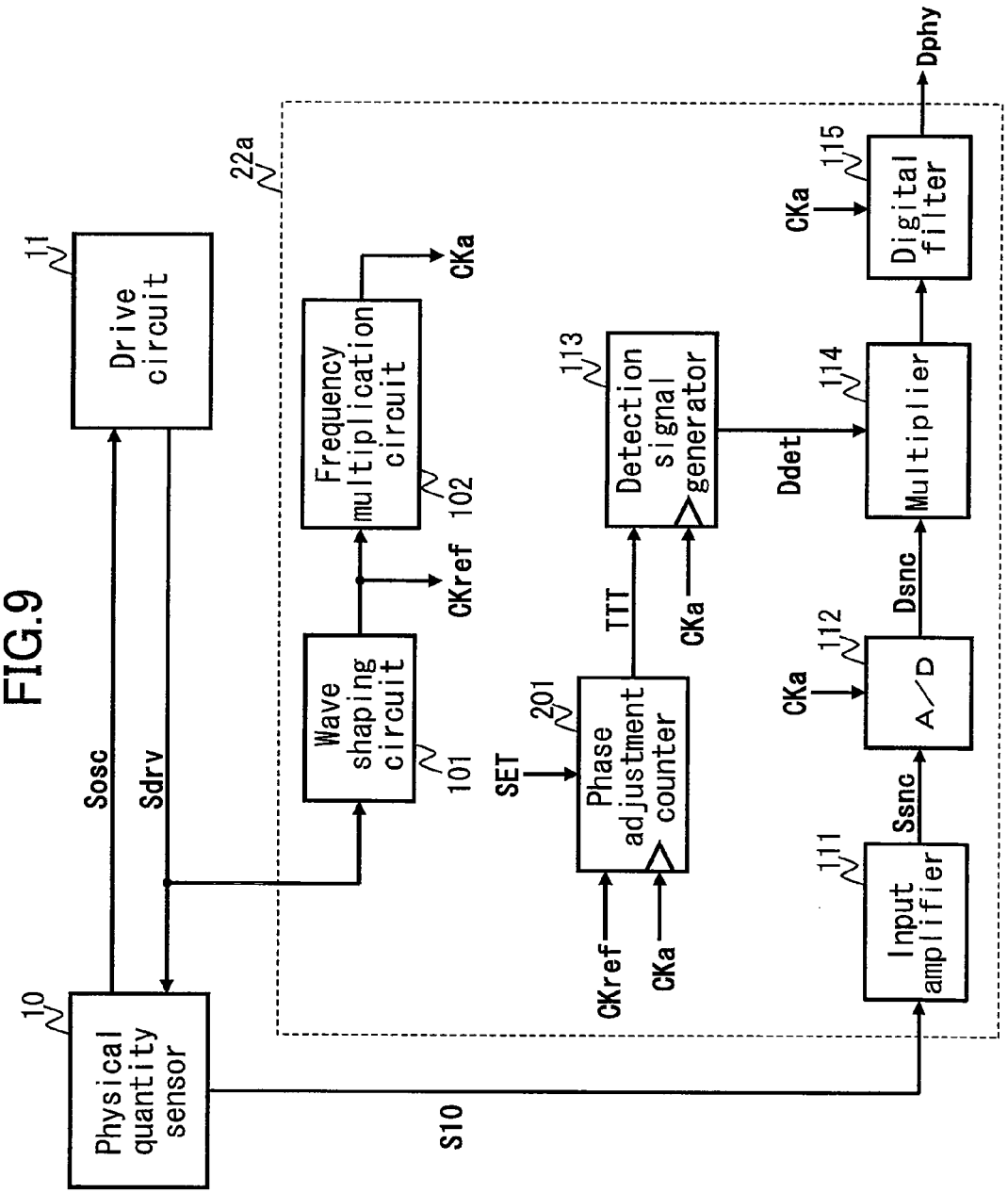
FIG. 9 is a view showing Alteration 1 of the physical quantity detection circuit shown in FIG. 7.

The phase adjustment counter 201 can also be applied to a digitized physical quantity detection circuit as shown in FIG. 9. A physical quantity detection circuit 22a shown in FIG. 9 includes the phase adjustment counter 201 in place of the phase adjustment circuit 100 shown in FIG. 3. The detection signal generator 113 starts generating the digital detection signal Ddet in response to a transition edge of the timing signal TTT from the phase adjustment counter 201. The other configuration is similar to that in FIG. 3.

Figure 10:
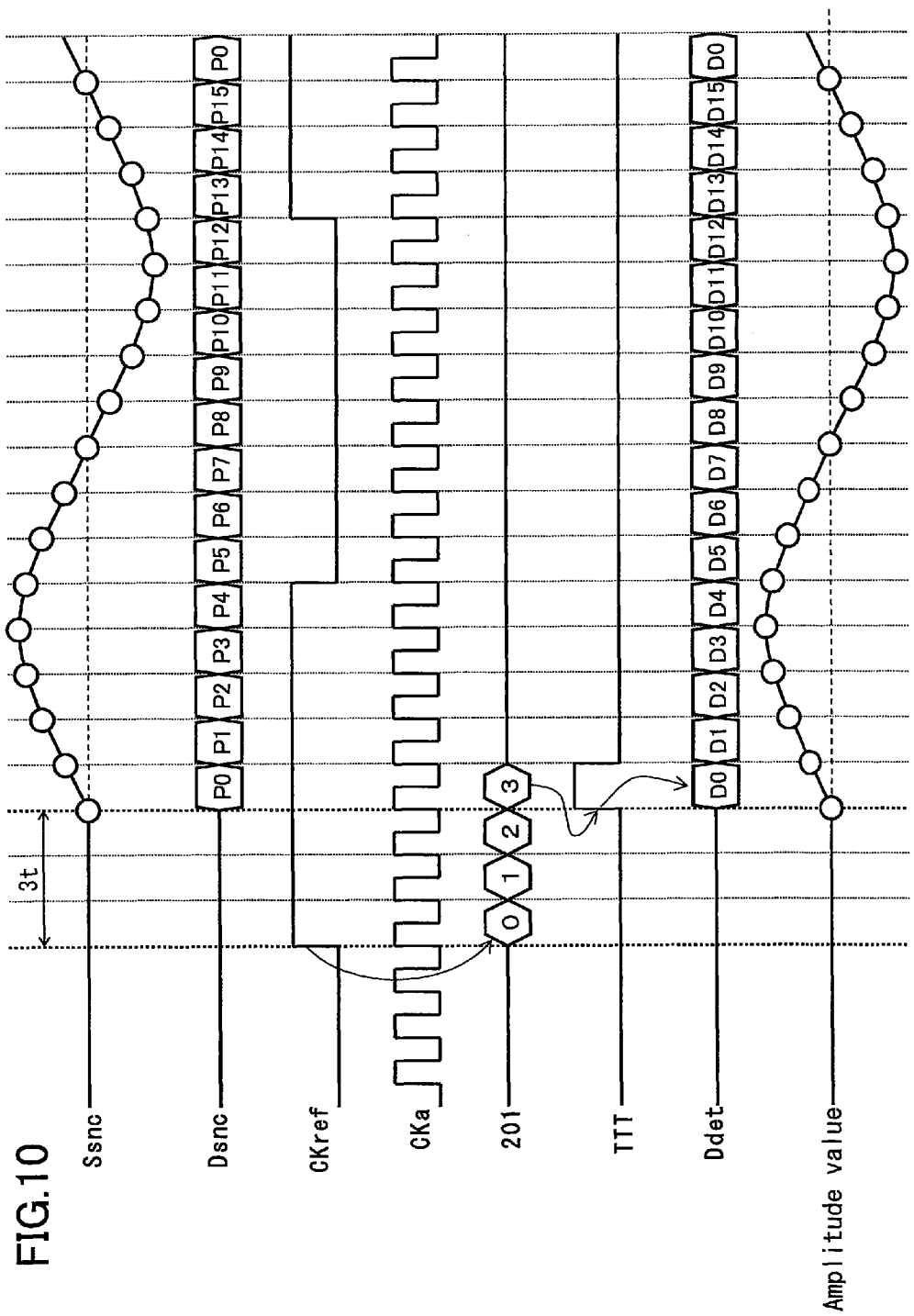
FIG. 10 is a timing chart illustrating the operation of the physical quantity detection circuit shown in FIG. 9.

As shown in FIG. 10, when the set value SET is set at "3," the phase adjustment counter 201 outputs the timing signal TTT after a lapse of the time "3t" corresponding to three pulses of the operation clock CKa from a transition edge of the reference clock CKref. The detection signal generator 113 outputs the sine wave data units D0, D1, D2, . . . in rotation in response to a transition edge of the timing signal TTT from the phase adjustment counter 201. This enables the digital detection signal Ddet to have the same phase as that of the analog sensor signal Ssnc.

The frequency adjustment counter 201 may operate in synchronization with another operation clock (a clock different in frequency from the operation clock CKa) having a frequency higher than the frequency of the reference clock CKref.

(Alteration 2 of Embodiment 2)

Figure 11:
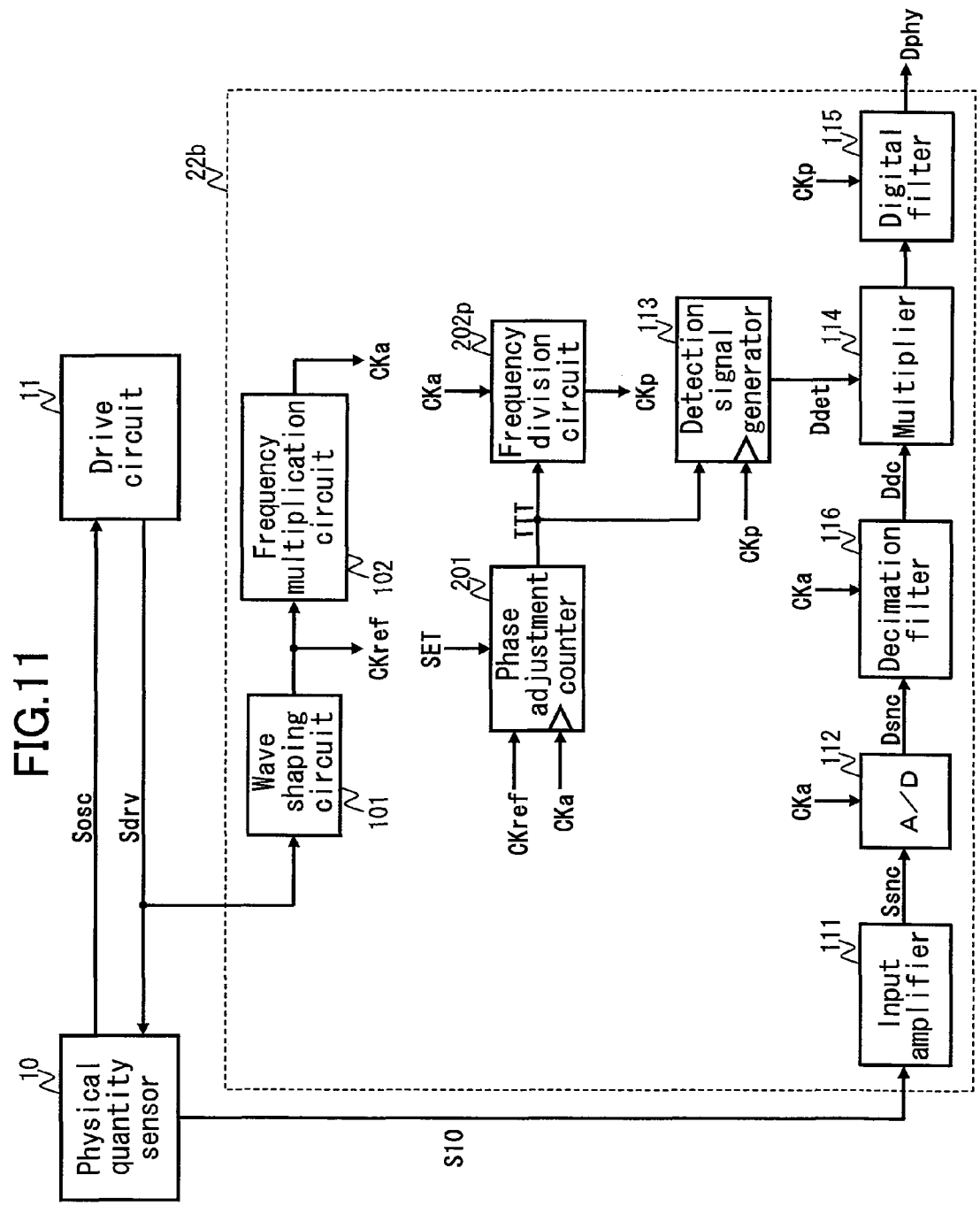
FIG. 11 is a view showing Alteration 2 of the physical quantity detection circuit shown in FIG. 7.

As shown in FIG. 11, another operation clock CKp may be generated in response to a transition edge of the timing signal TTT from the phase adjustment counter 201. A physical quantity detection circuit 22b shown in FIG. 11 includes a frequency division circuit 202p (clock generation circuit) and a decimation filter 116 in addition to the components shown in FIG. 9.

The frequency division circuit 202p, starting frequency division processing in response to a transition edge of the timing signal TTT from the phase adjustment counter 201, divides the frequency of the operation clock CKa to generate the operation clock CKp having a frequency lower than the frequency of the operation clock CKa. This enables the operation clock CKp to have the same phase as that of the analog sensor signal Ssnc. While the analog-to-digital converter 112, the decimation filter 116, and the phase adjustment counter 201 operate in synchronization with the operation clock CKa from the frequency multiplication circuit 102, the detection signal generator 113 and the digital filter 115 operate in synchronization with the operation clock CKp from the frequency division circuit 202p. Thus, the operating frequency is different between before and after the decimation filter 116. The decimation filter 116 executes decimation processing (conversion of the sampling frequency, decimation of digital values, etc.) for the digital sensor signal Dsnc, to convert the digital sensor signal Dsnc corresponding to the operation clock CKa to a digital sensor signal Ddc corresponding to the operation clock CKp.

With the above configuration, even when the operation clock CKa for the phase adjustment counter 201 is different from the operation clock CKp for the detection signal generator 113, it is possible to adjust the phase of the digital detection signal Ddet using the period of the operation clock CKa as the unit.

Embodiment 3

Figure 12:
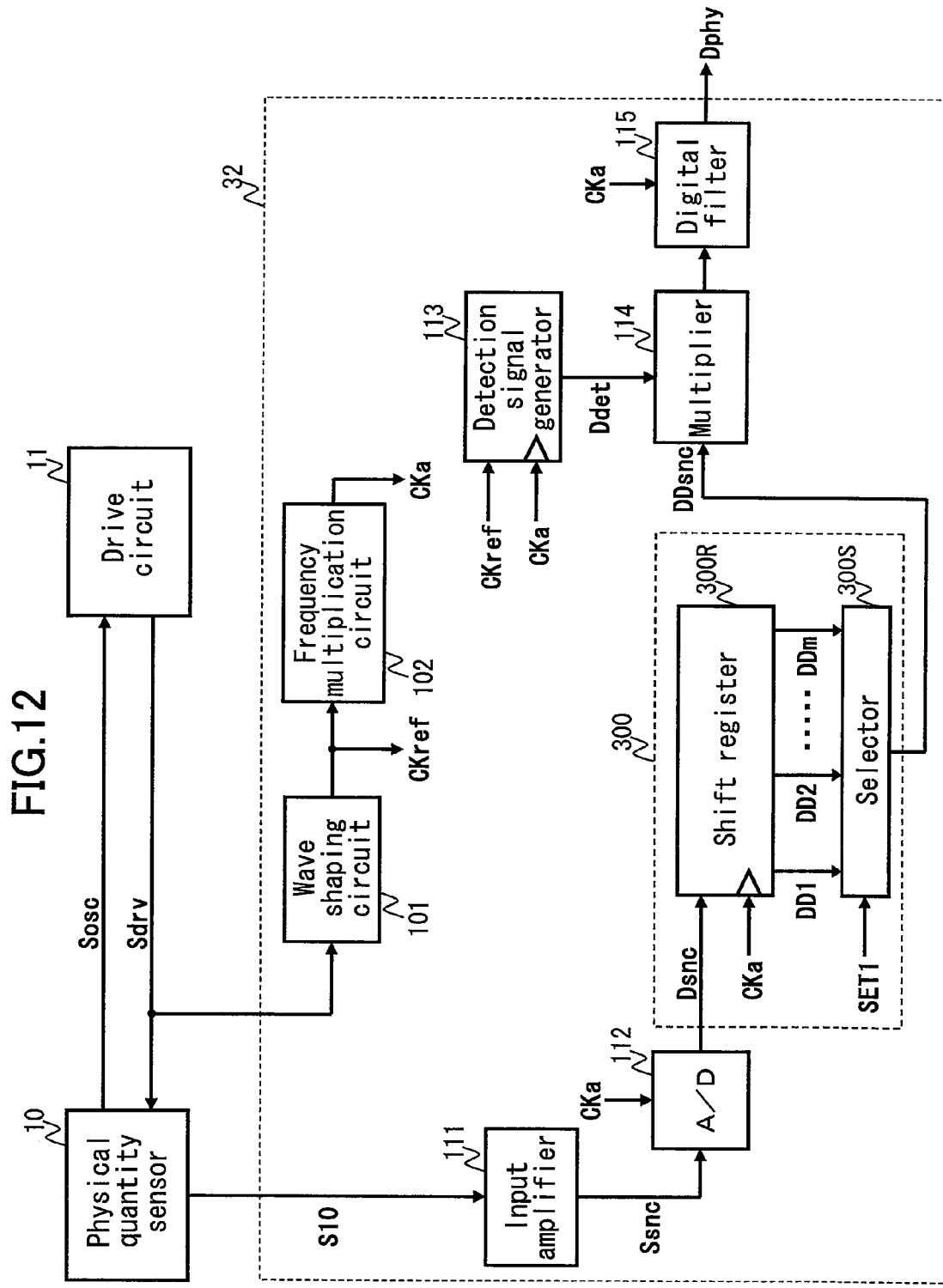
FIG. 12 is a view showing an example configuration of a physical quantity sensor device of Embodiment 3.

FIG. 12 shows an example configuration of a physical quantity sensor device of Embodiment 3. This physical quantity sensor device includes a physical quantity detection circuit 32 in place of the physical quantity detection circuit 12a shown in FIG. 3. The physical quantity detection circuit 32 includes a phase adjustment circuit 300 for adjusting the phase of the digital sensor signal Dsnc in place of the phase adjustment circuit 100 shown in FIG. 3. The other configuration is similar to that in FIG. 3.

The phase adjustment circuit 300 includes a shift register 300R and a selector 300S. The shift register 300R sequentially shifts the digital sensor signal Dsnc in synchronization with the operation clock CKa from the frequency multiplication circuit 102, to generate m (m is an integer equal to or more than 2) delayed signals DD1, DD2, . . . , DDm whose phases are shifted from each other by a predetermined amount. The shift register 300R includes a plurality of cascaded flipflops, for example. The selector 300S selects one of the delayed signals DD1, DD2, . . . , DDm according to a set value SET1 set under external control, and outputs the selected delayed signal as a delayed digital sensor signal DDsnc. The set value SET1 is a value for setting the delay time in the phase adjustment circuit 300, which indicates the number of pulses of the operation clock CKa. The detection signal generator 113 starts generation of the digital detection signal Ddet in response to a transition edge of the reference clock CKref. The multiplier 114 multiplies the delayed digital sensor signal DDsnc from the phase adjustment circuit 300 by the digital detection signal Ddet from the detection signal generator 113.

[Operation]

Figure 13:
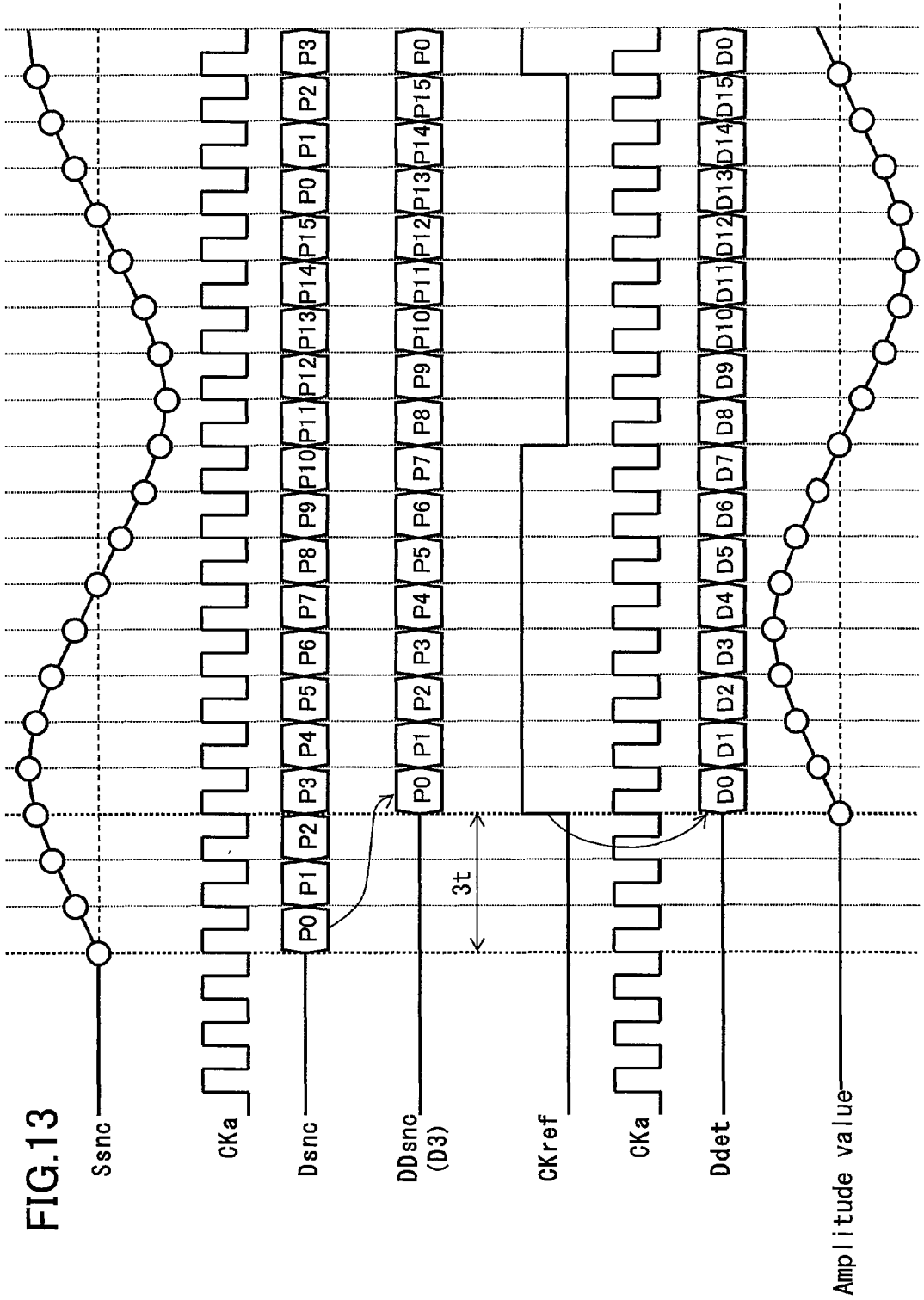
FIG. 13 is a timing chart illustrating the operation of a physical quantity detection circuit shown in FIG. 12.

Next, the operation of the physical quantity detection circuit 32 shown in FIG. 12 will be described with reference to FIG. 13. Assume in this embodiment that the phase of the analog sensor signal Ssnc leads the phase of the reference clock CKref by "3t."

The analog-to-digital converter 112 converts the analog sensor signal Ssnc to the digital sensor signal Dsnc. At this time, when the set value SET1 is set at "3," the shift register 300R selects the third delayed signal DD3 as the delayed digital sensor signal DDsnc. In other words, the phase adjustment circuit 300 delays the digital sensor signal Dsnc by the time "3t" corresponding to three pulses of the operation clock CKa. This enables the delayed digital sensor signal DDsnc to have the same phase as that of the reference clock CKref (i.e., the phase of the digital detection signal Ddet).

As described above, the phase of the sensor signal (delayed digital sensor signal DDsnc) can be set using the period of the operation clock CKa as the unit, and as the frequency of the operation clock CKa is higher, the phase of the delayed digital sensor signal DDsnc can be set more precisely. Hence, the phase relationship between the sensor signal and the detection signal can be adjusted more precisely than conventionally done, permitting improvement in detection precision.

The phase adjustment circuit 300 may otherwise be constructed of digital circuits. With this configuration, the robustness against fabrication variations and fluctuations in the surrounding environment can be more enhanced than conventionally done. The phase adjustment circuit 300 may operate in synchronization with another clock (a clock different in frequency from the operation clock CKa) having a frequency higher than the frequency of the reference clock CKref.

(Alteration 1 of Embodiment 3)

Figure 14:
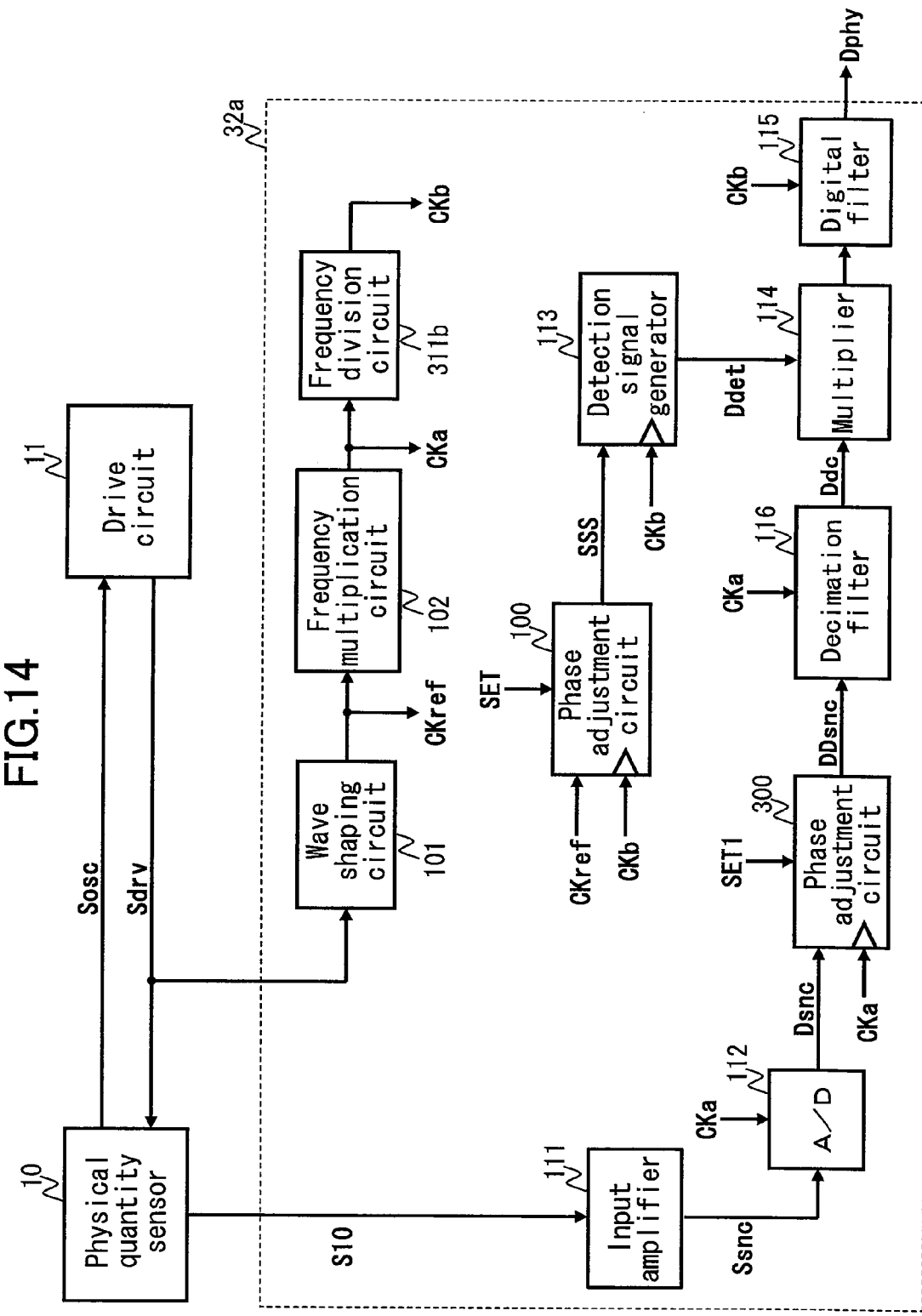
FIG. 14 is a view showing Alteration 1 of the physical quantity detection circuit shown in FIG. 12.

As shown in FIG. 14, two phase adjustment circuits may be used to adjust the phase of the sensor signal (digital sensor signal DDsnc) and the phase of the detection signal (digital detection signal Ddet). A physical quantity detection circuit 32a shown in FIG. 14 includes a frequency division circuit 311b, a decimation filter 116, and the phase adjustment circuit 100 shown in FIG. 3, in addition to the components shown in FIG. 12.

The frequency division circuit 311b divides the frequency of the operation clock CKa from the frequency multiplication circuit 102 to generate an operation clock CKb having frequency lower than the frequency of the operation clock CKa. While the analog-to-digital converter 112, the phase adjustment circuit 300, and the decimation filter 116 operate in synchronization with the operation clock CKa from the frequency multiplication circuit 102, the phase adjustment circuit 100, the detection signal generator 113, and the digital filter 115 operate in synchronization with the operation clock CKb from the frequency division circuit 311b. Thus, the operating frequency is different between before and after the decimation filter 116. The decimation filter 116 converts the delayed digital sensor signal DDsnc corresponding to the operation clock CKa to a digital sensor signal Ddc corresponding to the operation clock CKb.

[Operation]

Figure 15:
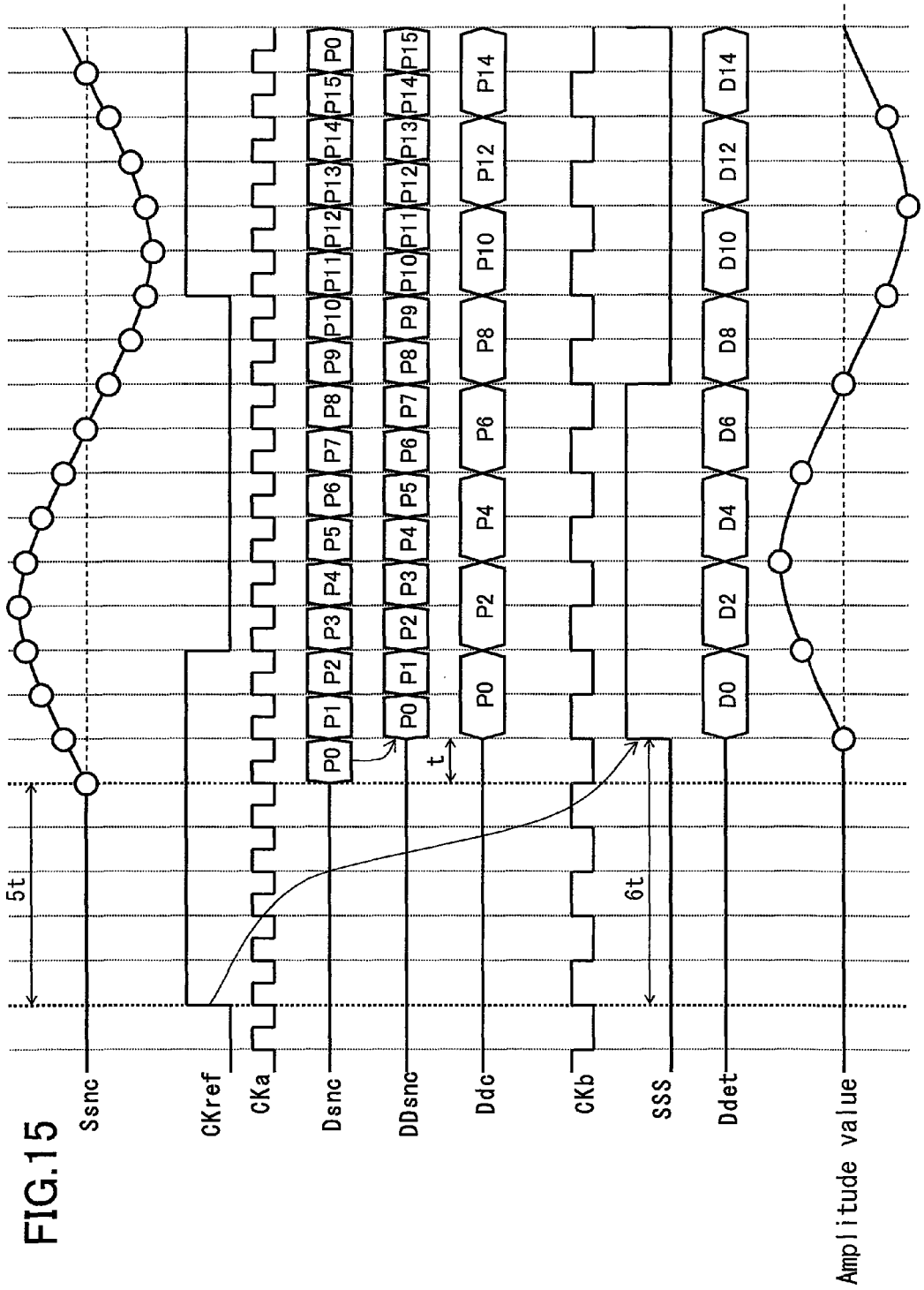
FIG. 15 is a timing chart illustrating the operation of the physical quantity detection circuit shown in FIG. 14.

Next, the operation of the physical quantity detection circuit 32a shown in FIG. 14 will be described with reference to FIG. 15. Assume in this embodiment that the phase of the analog sensor signal Ssnc lags behind the phase of the reference clock CKref by "5t." Assume also that the decimation filter 116 decimates the delayed digital sensor signal DDsnc, eliminating every other digital value, to allow the delayed digital sensor signal DDsnc to correspond to the frequency of the operation clock CKb (½ of the frequency of the operation clock CKa).

When the set value SET1 is set at "1," the phase adjustment circuit 300 delays the digital sensor signal Dsnc by the time "t" corresponding to one pulse of the operation clock CKa. Hence, the phase difference between the reference clock CKref and the delayed digital sensor signal DDsnc becomes "6t." Also, the phase difference between the reference clock CKref and the digital sensor signal Ddc obtained by the decimation filter 116 becomes "6t." Meanwhile, when the set value SET is set at "3," the phase adjustment circuit 100 delays the reference clock CKref by the time "6t" corresponding to three pulses of the operation clock CKb, to output the resultant clock as the selected clock SSS. Hence, the phase difference between the reference clock CKref and the digital detection signal Ddet becomes "6t." This enables the digital sensor signal Ddc to have the same phase as that of the digital detection signal Ddet.

As described above, with the phases of both the sensor signal (delayed digital sensor signal DDsnc) and the detection signal (digital detection signal Ddet) being settable, it is possible to correct both a phase delay in the sensor signal and a phase delay in the detection signal.

Also, since the operation clock CKb is lower in frequency than the operation clock CKa, the phase adjustment precision of the phase adjustment circuit 100 is lower than that of the phase adjustment circuit 300. With this sharing of the phase adjustment processing between the phase adjustment circuits 100 and 300 that are different in phase adjustment precision, the circuit scale and power consumption required for the phase adjustment processing can be reduced. For example, when a configuration permitting a maximum settable delay time of "16t" where "t" is the period of the operation clock CKa is intended, 16 flipflops must be provided for the phase adjustment circuit 100 in the physical quantity detection circuit 12a shown in FIG. 3. In the physical quantity detection circuit 32a shown in FIG. 14, however, only four flipflops each may be provided for the phase adjustment circuits 100 and 300.

(Alteration 2 of Embodiment 3)

Figure 16:
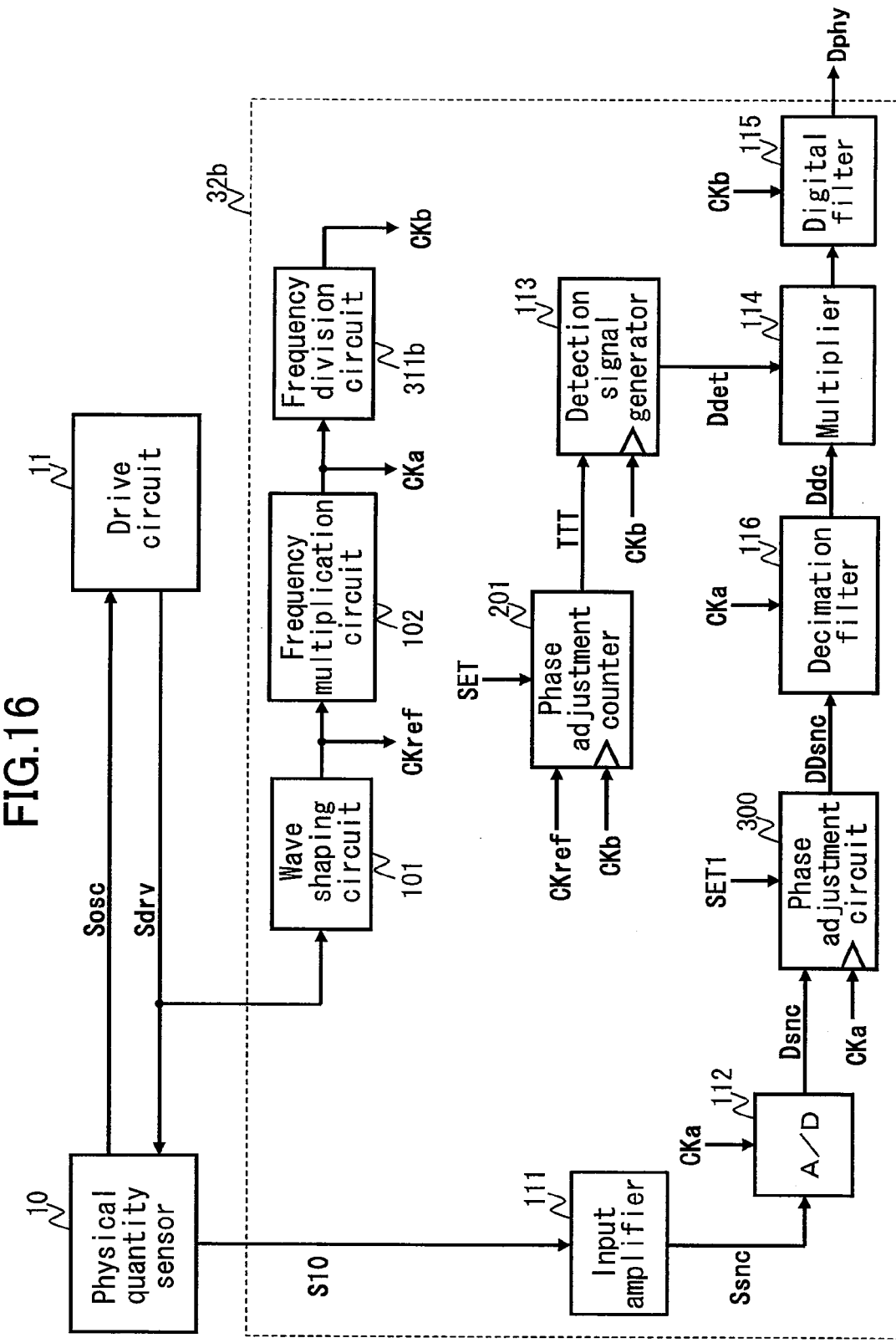
FIG. 16 is a view showing Alteration 2 of the physical quantity detection circuit shown in FIG. 12.

The phase adjustment circuit 100 shown in FIG. 14 may be replaced with the phase adjustment counter 201 shown in FIG. 9, as shown in a physical quantity detection circuit 32b shown in FIG. 16. The phase adjustment counter 201 operates in synchronization with the operation clock CKb lower in frequency than the operation clock CKa. With this configuration, also, similar effects to those in the case of FIG. 14 can be obtained.

(Alteration 3 of Embodiment 3)

Figure 17:
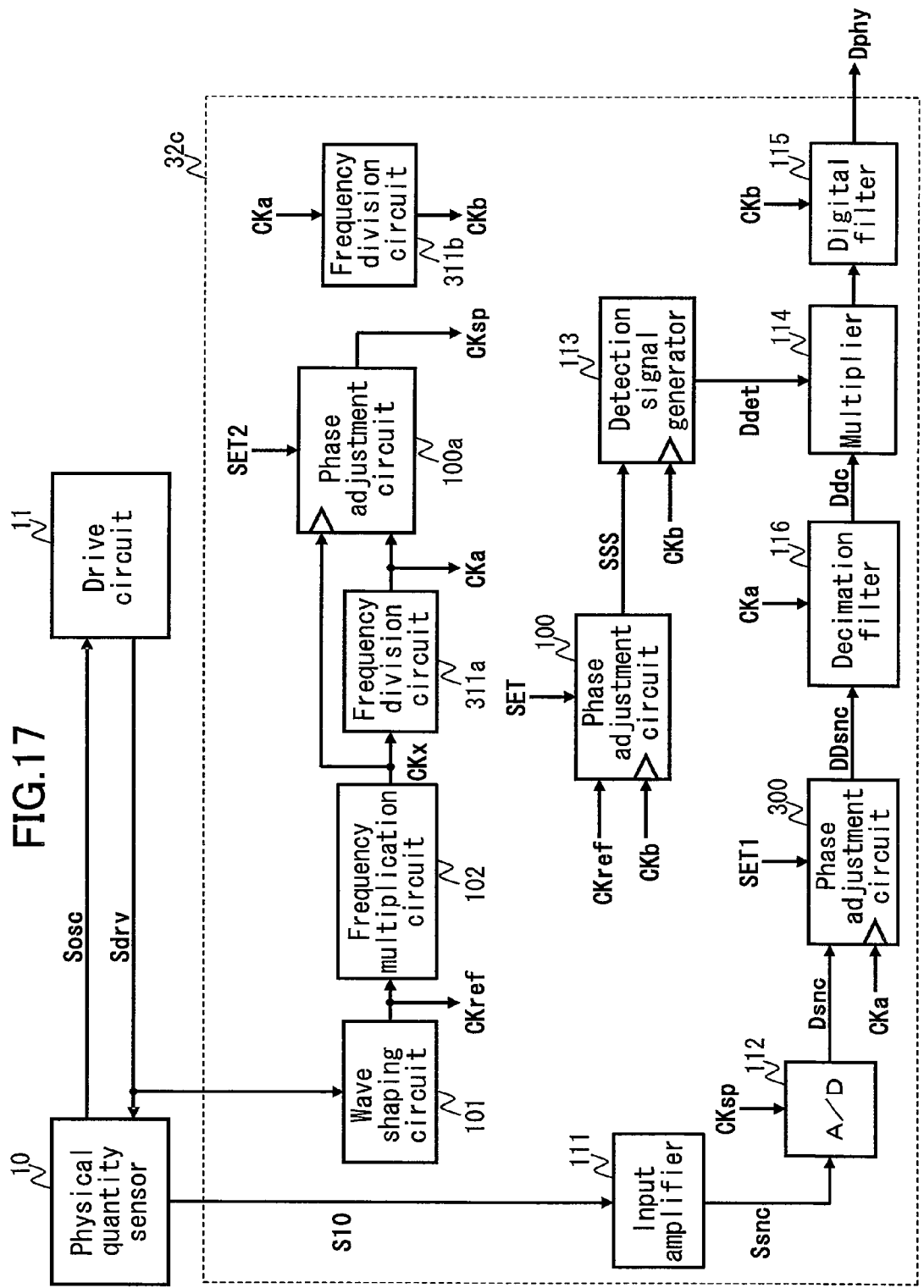
FIG. 17 is a view showing Alteration 3 of the physical quantity detection circuit shown in FIG. 12.

As shown in FIG. 17, three phase adjustment circuits may be used to adjust the phase of a sampling clock CKsp for the analog-to-digital converter 112, the phase of the sensor signal (delayed digital sensor signal DDsnc), and the phase of the detection signal (digital detection signal Ddet). A physical quantity detection circuit 32c shown in FIG. 17 includes a frequency division circuit 311a and a phase adjustment circuit 100a, in addition to the components shown in FIG. 14.

The frequency multiplication circuit 102 multiplies the reference clock CKref to generate a multiplied clock CKx. The frequency division circuit 311a divides the frequency of the multiplied clock CKx from the frequency multiplication circuit 102 to is generate the operation clock CKa having the same frequency as the sampling frequency required for the analog-to-digital converter 112. The frequency division 311b divides the frequency of the operation clock CKa from the frequency division circuit 311a to generate the operation clock CKb.

In the phase adjustment circuit 100a, which is similar in configuration to the phase adjustment circuit 100, the shift register sequentially shifts the operation clock CKa in synchronization with the multiplied clock CKx, to generate a plurality of delayed clocks whose phases are shifted from each other by a predetermined amount. The selector of the phase adjustment circuit 100a selects one of the plurality of delayed clocks generated by the shift register according to a set value SET2 set under external control, and outputs the selected delayed clock as the sampling clock CKsp. The set value SET2 is a value for setting the delay time in the phase adjustment circuit 100a, which indicates the number of pulses of the multiplied clock CKx.

[Operation]

Figure 18:
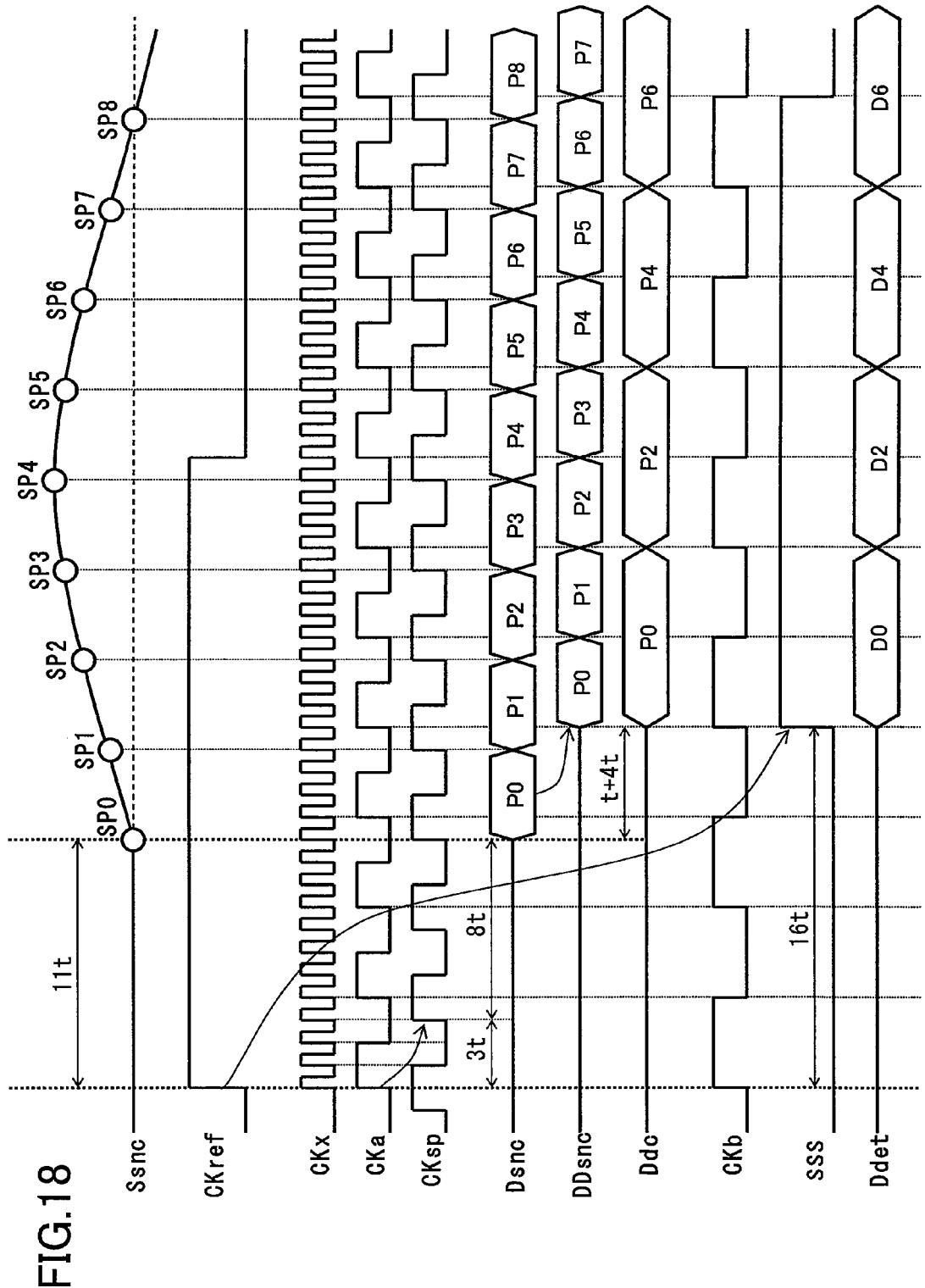
FIG. 18 is a timing chart illustrating the operation of the physical quantity detection circuit shown in FIG. 17.

Next, the operation of the physical quantity detection circuit 32c shown in FIG. 17 will be described with reference to FIG. 18. Assume in this alteration that the period of the multiplied clock CKx is "t" and that the phase of the analog sensor signal Ssnc lags behind the phase of the reference clock CKref by "11t." Assume also that the frequency of the operation clock CKa (sampling clock CKsp) and the frequency of the operation clock CKb are respectively "¼" and "⅛" of the multiplied clock CKx.

Transition edges of the operation clock CKa (pre-phase-adjusted sampling clock CKsp) do not agree with desired sampling points SP0, SP1, SP2, . . . of the analog sensor signal Ssnc (e.g., points corresponding to sine wave data units D0, D1, D2, . . . ). At this time, when the set value SET2 in the phase adjustment circuit 100a is set at "3," the phase adjustment circuit 100a delays the operation clock CKa by the time "3t" corresponding to three pulses of the multiplied clock CKx, and outputs the resultant clock as the sampling clock CKsp. This enables the transition edges of the sampling clock CKsp to agree with the desired sampling points SP0, SP1, SP2 . . . .

When the set value SET1 in the phase adjustment circuit 300 is set at "1," the phase adjustment circuit 300 delays the digital sensor signal Dsnc by the time "4t" corresponding to one pulse of the operation clock CKa, and outputs the resultant signal as the delayed digital sensor signal DDsnc. Since the phase of the operation clock CKa is shifted by "t" from the phase of the sampling clock CKsp, the phase difference between the reference clock CKref and the delayed digital sensor signal DDsnc becomes "16t (=3t+8t+t+4t)." Also, the phase difference between the reference clock CKref and the digital sensor signal Ddc from the decimation filter 105 becomes "16t."

Meanwhile, when the set value SET in the phase adjustment circuit 100 is set at "2," the phase adjustment circuit 100 delays the reference clock CKref by the time "16t" corresponding to two pulses of the operation clock CKb, and outputs the resultant clock as the selected clock SSS. Hence, the phase difference between the reference clock CKref and the digital detection signal Ddet becomes "16t."

As described above, the phase of the sampling clock CKsp for the analog-to-digital converter 112 can be set using the period of the multiplied clock CKx as the unit. Also, by adjusting the phase of the sampling clock CKsp, the sampling points (positions of transition edges of the sampling clock CKsp) can be shifted, and as a result, the phase of the digital sensor signal Dsnc can be changed. It is therefore possible to improve the precision of the phase adjustment while suppressing increase in the sampling frequency for the analog-to-digital converter 112. Also, since transition edges of the sampling clock can be made to agree with (or approximated to) desired sampling points SP0, SP1, SP2, . . . , the precision of the analog-to-digital conversion can be improved.

The frequency division circuit 311b may otherwise generate the operation clock CKb by dividing the frequency of the sampling clock CKsp from the phase adjustment circuit 100a.

(Alteration 4 of Embodiment 3)

Figure 19:
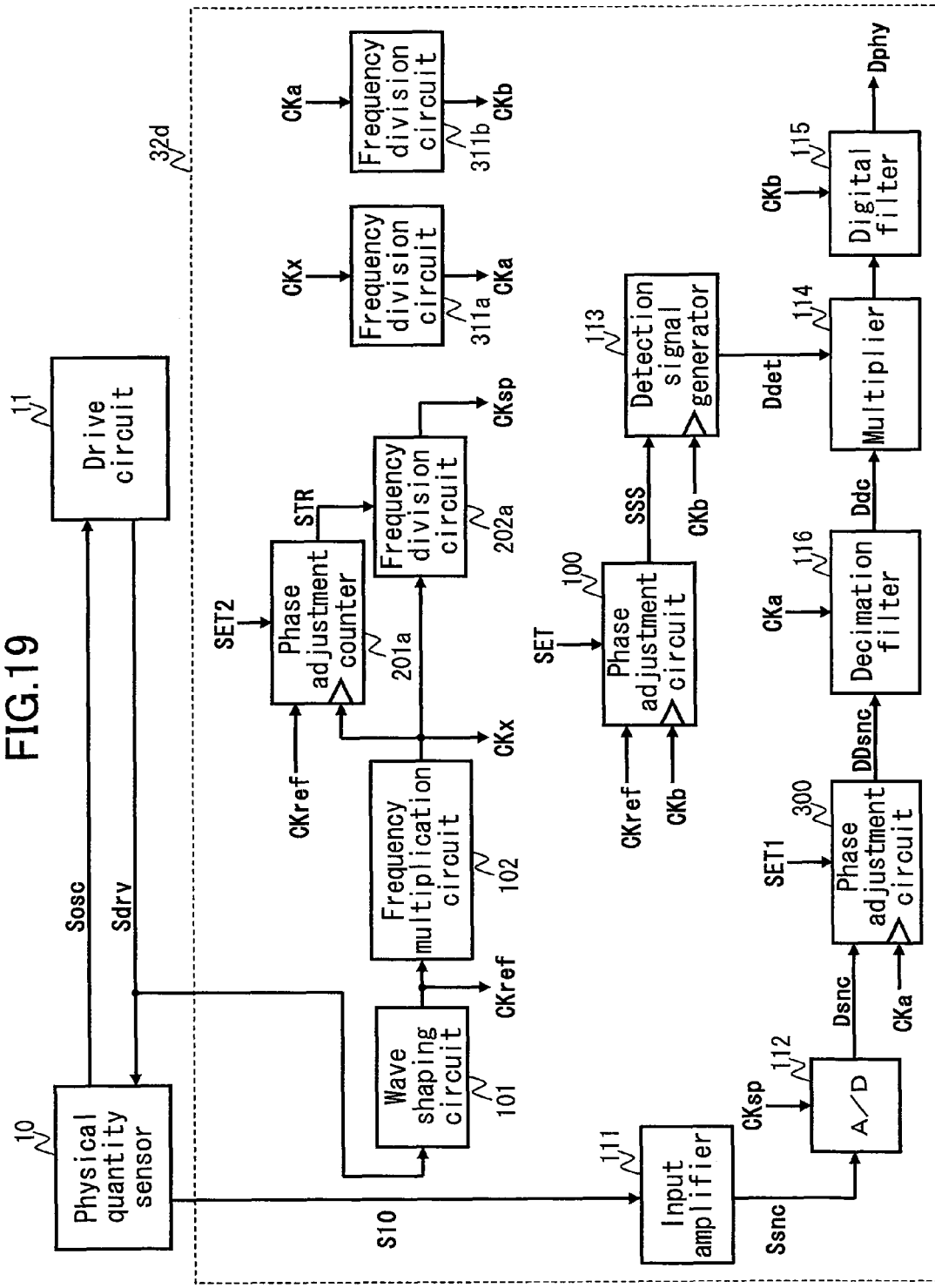
FIG. 19 is a view showing Alteration 4 of the physical quantity detection circuit shown in FIG. 12.

As shown in FIG. 19, a phase adjustment counter may be used for adjusting the phase of the sampling clock CKsp for the analog-to-digital converter 112. A physical quantity detection circuit 32d shown in FIG. 19 includes a phase adjustment counter 201a and a frequency division circuit 202a, in place of the phase adjustment circuit 100a shown in FIG. 17. The other configuration is similar to that in FIG. 17. The phase adjustment counter 201a starts counting the number of generated pulses of the multiplier clock CKx in response to a transition edge of the reference clock CKref, and outputs a timing signal STR once the count value reaches a set value SET2 set under external control. The frequency division circuit 202a starts frequency division processing in response to a transition edge of the timing signal STR from the phase adjustment counter 201a, dividing the frequency of the multiplied clock CKx from the frequency multiplication circuit 102 to generate a sampling clock CKsp having a predetermined frequency. Note that the phase adjustment circuit 100 shown in FIGS. 17 and 19 may also be replaced with the phase adjustment counter 201 shown in FIG. 9. In this case, also, similar effects to those in FIG. 17 can be obtained.

Other Embodiments

Figure 20:
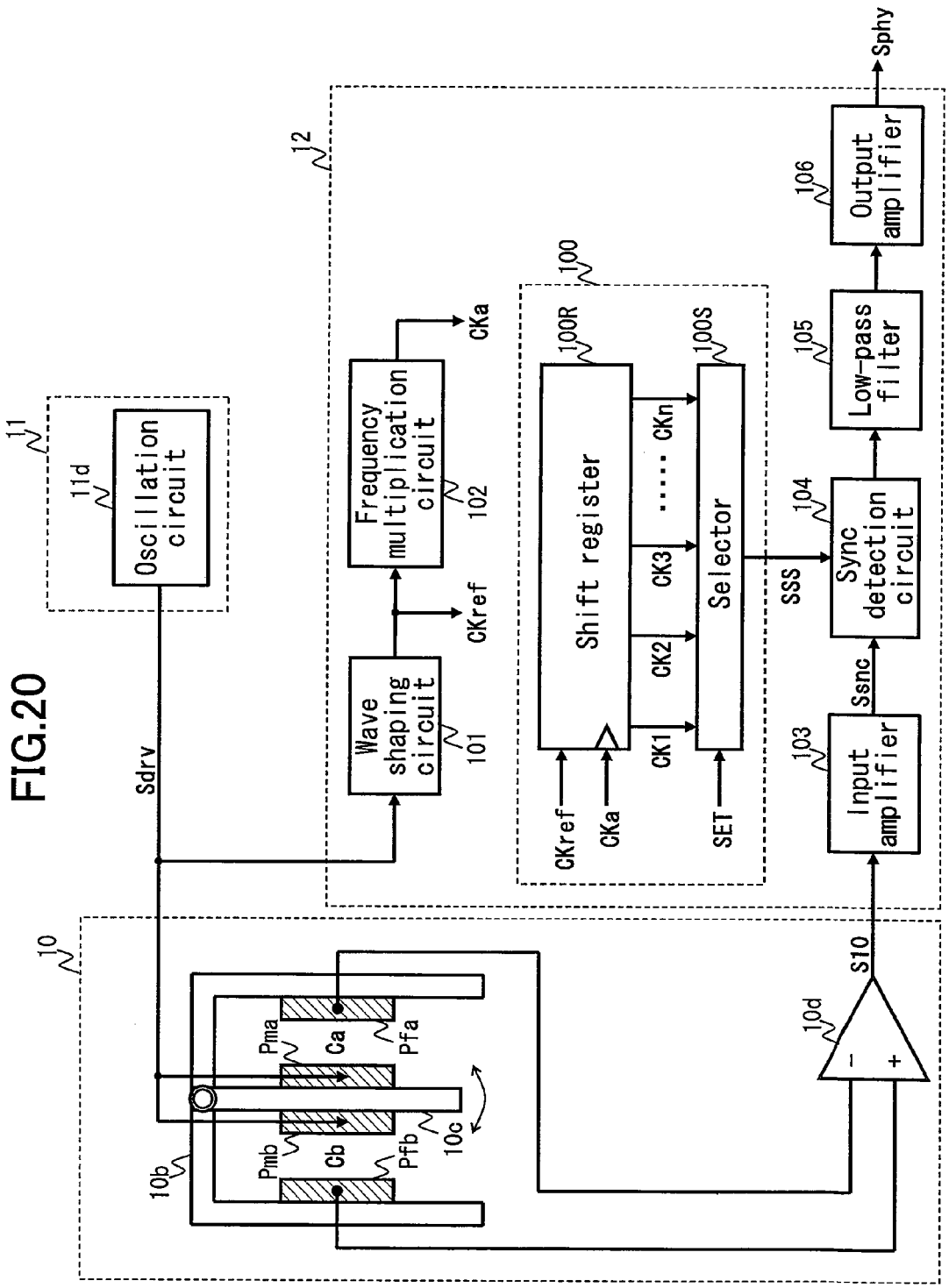
FIG. 20 is a view showing an alteration of a physical quantity sensor.

The physical quantity sensor 10 does not have to be of the tuning fork type, but may be of a circular cylinder type, a regular triangular prism type, a square prism type, or a ring type, or may be of another shape. Otherwise, as shown in FIG. 20, the physical quantity sensor 10 may be a capacitive acceleration sensor. In this case, the physical quantity sensor 10 includes a fixed portion 10b, a movable portion 10c, movable electrodes Pma and Pmb, detection electrodes Pfa and Pfb, and a differential amplifier 10d. The movable portion 10c is connected to the fixed portion 10b so that it can be displaced according to acceleration. The movable electrodes Pma and Pmb are placed on the movable portion 10c. The detection electrode Pfa and Pfb are placed on the fixed portion 10b so as to face the movable electrodes Pma and Pmb, respectively. That is, the movable electrode Pma and the detection electrode Pfa constitute a capacitor Ca, and the movable electrode Pmb and the detection electrode Pfb constitute a capacitor Cb.

A drive signal Sdrv from an oscillation circuit 11*d* is supplied to the capacitors Ca and Cb. The differential amplifier 10*d* outputs a sensor signal S10 corresponding to the difference between the charge amounts generated in the detection electrodes Pfa and Pfb. Once acceleration occurs, one of the capacitances of the capacitors Ca and Cb increases while the other decreases, due to a displacement of the movable portion 10*c*. This causes a difference in charge amount between the detection electrodes Pfa and Pfb, and the sensor signal S10 corresponding to this difference is outputted.

In the above embodiments, the set values SET, SET1, and SET2 are described as changeable values. Alternatively, the set values SET, SET1, and SET2 may be fixed values.

The physical quantity detection circuits described above, capable of adjusting the phase relationship between the sensor signal and the detection signal precisely, are suitable for physical quantity sensors (e.g., tuning fork type angular velocity sensors, capacitive acceleration sensors, etc.) used in mobile units, cellular phones, digital cameras, game machines, and the like.

It should be noted that the embodiments described above are essentially preferred illustrations, and by no means intended to restrict the scope of the present invention, applications thereof, or uses thereof.

What is claimed is:

1. A physical quantity detection circuit used for a physical quantity sensor that outputs a sensor signal according to a physical quantity given externally, the circuit comprising:
    a first phase adjustment circuit configured to receive a reference clock having a frequency corresponding to the frequency of the sensor signal and operate in synchronization with a first operation clock having a frequency higher than the frequency of the reference clock, to delay a transition edge of the reference clock by a predetermined number of pulses of the first operation clock: and
    a detection circuit configured to detect a physical quantity signal corresponding to the physical quantity from the sensor signal using a transition edge of the reference clock delayed by the first phase adjustment circuit as the reference,
    wherein the first phase adjustment circuit includes
    a phase adjustment counter configured to start counting the number of generated pulses of the first operation clock in response to a transition edge of the reference clock and generate a timing signal once the number of generated pulses reaches a predetermined value, and
    the detection circuit includes
    an analog-to-digital converter circuit configured to convert the sensor signal to a digital sensor signal,
    a detection signal generator circuit configured to generate a digital detection signal corresponding to a sine wave signal in response to a transition edge of the timing signal generated by the phase adjustment counter, and
    a multiplier circuit configured to multiply the digital sensor signal obtained by the analog-to-digital converter circuit by the digital detection signal generated by the detection signal generator circuit, to detect the physical quantity signal.

2. The physical quantity detection circuit of claim 1, wherein the first phase adjustment circuit further includes a clock generator circuit configured to generate an operation clock for the detection signal generator circuit in response to the transition edge of the timing signal generated by the phase adjustment counter.

3. The physical quantity detection circuit of claim 1, further comprising:
    a second phase adjustment circuit configured to receive the digital sensor signal obtained by the analog-to-digital converter circuit and operate in synchronization with a second operation clock having a frequency higher than the frequency of the reference clock, to delay the digital sensor signal by a predetermined number of pulses of the second operation clock,
    wherein the multiplier circuit multiplies the digital sensor signal delayed by the second phase adjustment circuit by the digital detection signal.

4. The physical quantity detection circuit of claim 3, wherein the frequency of the first operation clock is lower than the frequency of the second operation clock.

5. The physical quantity detection circuit of claim 3, wherein the number of pulses of the second operation clock for determining the delay time in the second phase adjustment circuit is changeable.

6. The physical quantity detection circuit of claim 1, wherein the number of pulses of the first operation clock for determining the delay time in the first phase adjustment circuit is changeable.

7. A physical quantity sensor device comprising:
    the physical quantity detection circuit of claim 1;
    the physical quantity sensor; and
    a drive circuit configured to supply a drive signal having a predetermined frequency to the physical quantity sensor,
    wherein the frequency of the sensor signal and the frequency of the reference clock correspond to the frequency of the drive signal.

8. A physical quantity detection circuit used for a physical quantity sensor that outputs a sensor signal according to a physical quantity given externally, the circuit comprising:
    an analog-to-digital converter circuit configured to convert the sensor signal to a digital sensor signal;
    a detection signal generator circuit configured to generate a digital detection signal corresponding to a sine wave signal in response to a transition edge of a reference clock having a frequency corresponding to the frequency of the sensor signal;
    a phase adjustment circuit configured to receive the digital sensor signal obtained by the analog-to-digital converter circuit and operate in synchronization with an operation clock having a frequency higher than the frequency of the reference clock, to delay the digital sensor signal by a predetermined number of pulses of the operation clock; and
    a multiplier circuit configured to multiply the digital sensor signal delayed by the phase adjustment circuit by the digital detection signal generated by the detection signal generator circuit, to detect a physical quantity signal corresponding to the physical quantity.

9. A physical quantity sensor device comprising:
    the physical quantity detection circuit of claim 8;
    the physical quantity sensor; and
    a drive circuit configured to supply a drive signal having a predetermined frequency to the physical quantity sensor,
    wherein the frequency of the sensor signal and the frequency of the reference clock correspond to the frequency of the drive signal.

* * * * *